United States Patent
Aulie et al.

(10) Patent No.: US 12,547,666 B1
(45) Date of Patent: Feb. 10, 2026

(54) CONTEXT-BASED RECOMMENDATION GENERATION

(71) Applicant: Block, Inc., San Francisco, CA (US)

(72) Inventors: Simen Smith Aulie, Hyggen (NO); Pal Berg, Oslo (NO)

(73) Assignee: Block, Inc., Oakland, CA (US)

( * ) Notice: Subject to any disclaimer, the term of this patent is extended or adjusted under 35 U.S.C. 154(b) by 208 days.

(21) Appl. No.: 18/305,004

(22) Filed: Apr. 21, 2023

(51) Int. Cl.
- *G06F 16/00* (2019.01)
- *G06F 16/9535* (2019.01)
- *G06F 40/40* (2020.01)
- *G06Q 20/12* (2012.01)
- *G06Q 30/0601* (2023.01)

(52) U.S. Cl.
CPC .......... *G06F 16/9535* (2019.01); *G06F 40/40* (2020.01); *G06Q 20/123* (2013.01); *G06Q 30/0625* (2013.01); *G06Q 30/0631* (2013.01)

(58) Field of Classification Search
CPC .............................. G06F 16/9535; G06F 16/00
See application file for complete search history.

(56) References Cited

U.S. PATENT DOCUMENTS

| | | | |
|---|---|---|---|
| 9,275,106 B2 * | 3/2016 | Djabarov | G06F 16/3325 |
| 11,875,241 B2 * | 1/2024 | Abdallah | G06F 40/30 |

\* cited by examiner

*Primary Examiner* — Cheryl Lewis
(74) *Attorney, Agent, or Firm* — IP Spring

(57) ABSTRACT

Context rules, machine learning, and user interface in context-based search techniques are described. In an implementation, inputs are received via a user interface describing a plurality of contexts associated with user consumption of digital content. A plurality of context rules are generated based on the inputs and a plurality of rule search results are generated based on context data. The context data details the plurality of contexts associated with user consumption of the digital content. One or more machine learning models are trained based on the context data. A determination is made that a transition point has been reached, and in response, a transition is performed between use of the plurality of context rules and use of the one or more machine-learning models in generating a plurality of subsequent search results.

20 Claims, 18 Drawing Sheets

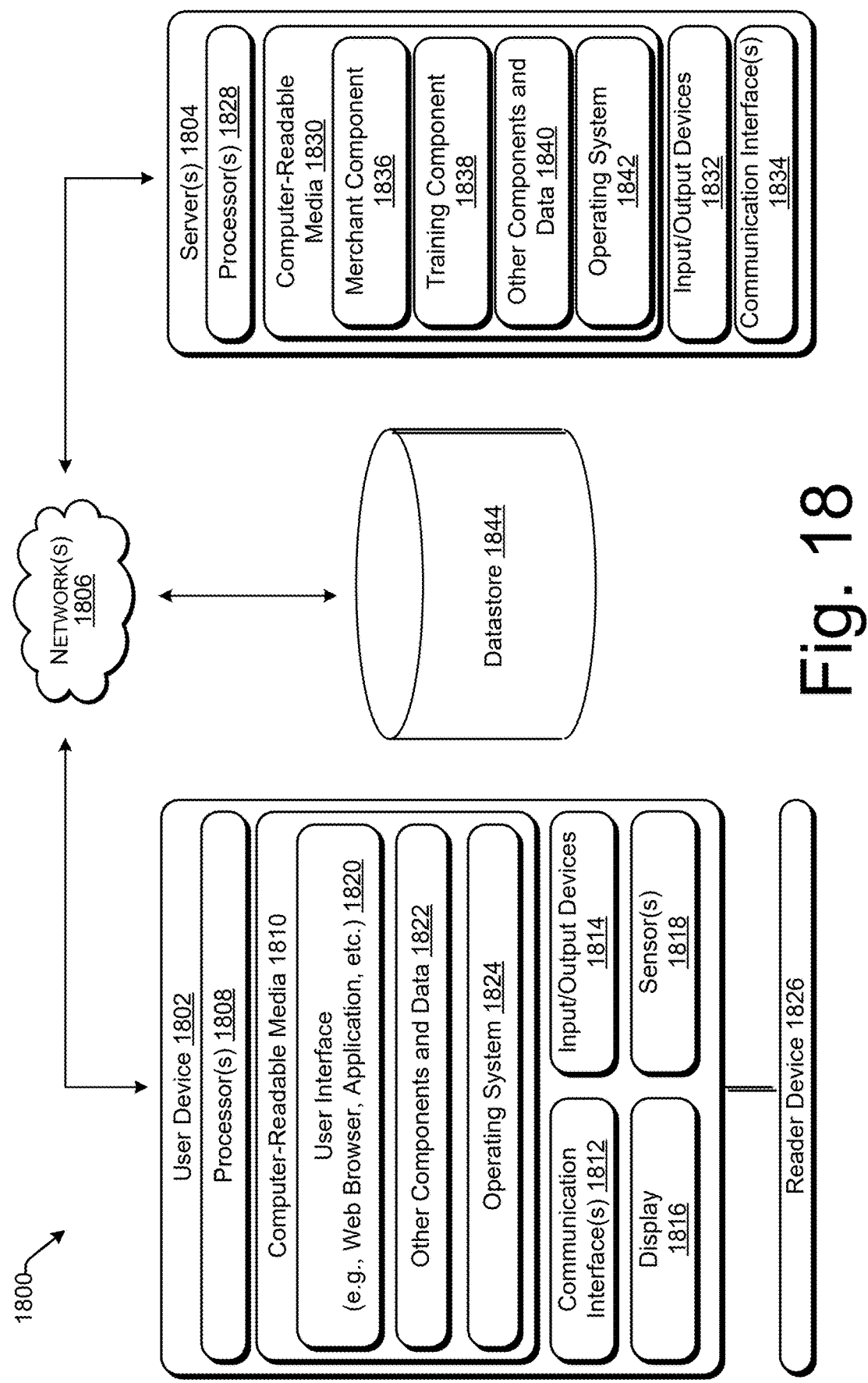

CONTEXT-BASED RECOMMENDATION GENERATION

TECHNICAL FIELD

Search techniques are used to support a variety of functionality, examples of which are commonly involved in locating particular items from potentially hundreds of thousands and even millions of items of digital content. However, conventional search techniques suffer from numerous technical challenges that limit accuracy, reduce operational efficiency of computing devices that implement these techniques, and increase power consumption.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 18 is a block diagram showing a system for performing techniques described herein with which techniques described herein can be implemented, according to an embodiment described herein.

DETAILED DESCRIPTION

Overview

Figure 1:
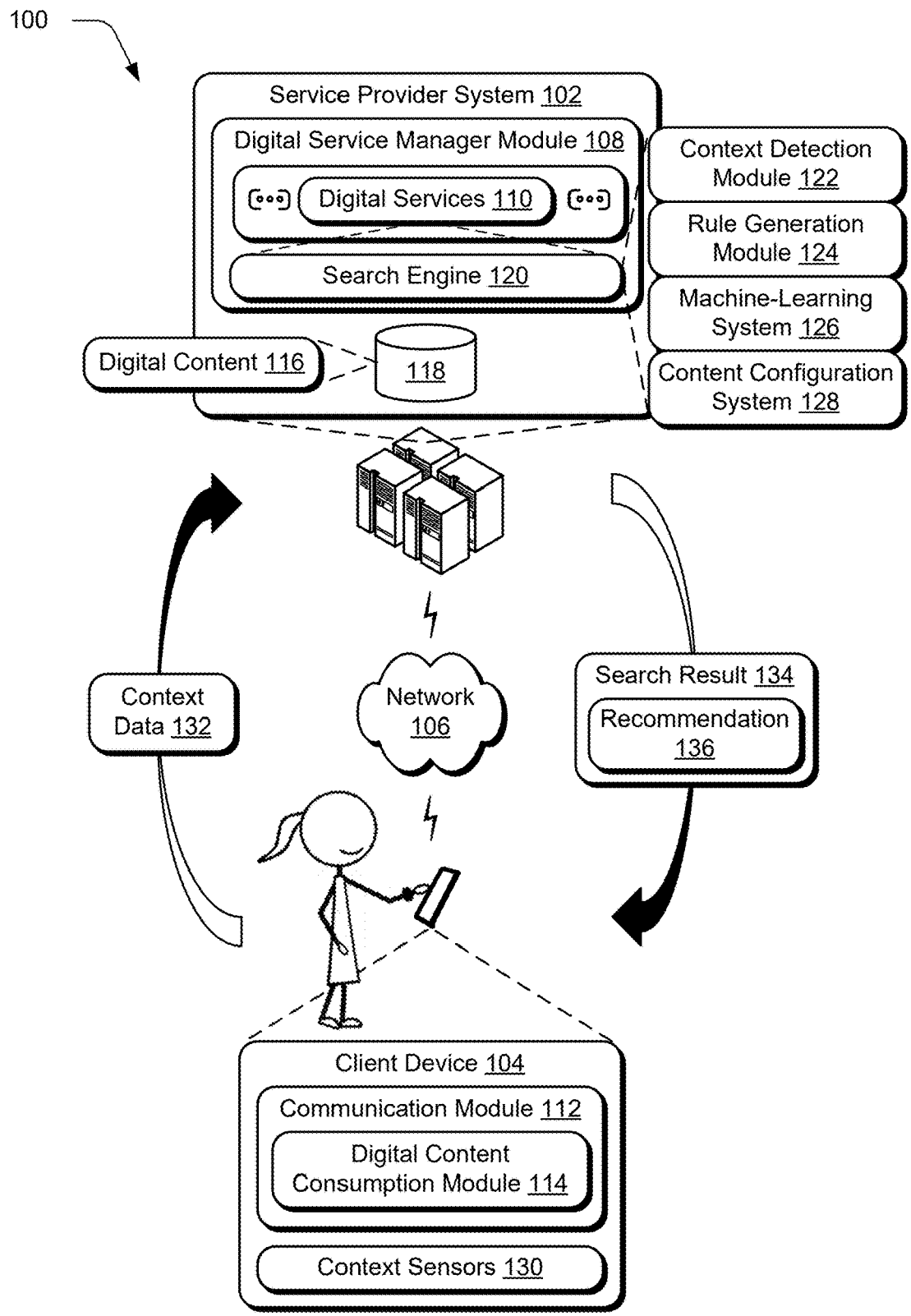
FIG. 1 is a block diagram depicting a non-limiting example environment of digital services configurable to implement search techniques that address context as described herein according to an implementation of the present subject matter.

Search functionality is implemented by computing devices to aid user interaction with a multitude of types of digital content having a corresponding vast number of those types of digital content. As such, search functionality is foundational in support of a variety of digital services, examples of which include search engines as part of a digital service configured to locate digital content, digital services configured to stream particular items of digital content, recommendation engines used to identify a potential item of digital content of interest, and so forth.

Conventional techniques used to implement search functionality, however, are typically implemented as generic to a user, if even tailored to a user, and as such do not address a context in which the search is performed. Consequently, conventional techniques lack accuracy, result in overconsumption of computing resources, and increase power consumption.

Accordingly, techniques and systems are described to overcome these technical challenges in support of context-based search. Context includes usage scenarios and actions performed based on those scenarios, such as to detect a geographic location, detect travel and download songs before loss of signal, and so forth. Examples of context include but are not limited to user context (e.g., inclusion of other users in a defined proximity), biometric context (e.g., heart rate, oxygen level), environmental context (e.g., geographic location, traveling, weather), digital content context data (e.g., other items of digital content consumed by the user), consumption context data (e.g., devices used for consumption, time of day digital content is consumed), calendar context data (e.g., access an API of a user's calendar to determine activities scheduled currently or in the future), and so forth.

Through use of the context-based recommendation techniques described herein, search provider systems are configurable to perform a search based on context data describing the context. Search, as addressing context, is usable to support a variety of functionalities. In a recommendation scenario, for instance, search is used to locate digital content (e.g., digital music) that serves as a basis for a recommendation to an entity. The search, in one or more examples, is performed based on characteristics of the user as well as a context associated with the user, which is then used to generate a recommendation, e.g., of digital music. Search is also usable to locate and refine visual aspects based on a context, e.g., for configuring a user interface to include text and digital images received as a search result based on a context.

In a first example, context rules and machine learning are employed to support a search context, user customization, and address a "cold start" problem. In a second example, user interfaces are configurable to support specification of context usable to control which contexts are used as part of a search. The user interfaces are also configurable to include representations (e.g., icons) indicative of contexts used to perform the search which support user interaction to modify search parameters for a subsequent search. As a result, these techniques improve search accuracy through addressing a search context, improve efficiency in computational resource consumption, and reduce power consumption.

In the first example, context rules are generated through interaction with a user interface. The context rules are used to provide context to searches performed by a search engine. To do so, a user interface is output that is configured to accept inputs identifying a particular context and criteria to be used regarding that context. The user interface, for instance, may receive inputs regarding an environmental context of "weather" and specify criteria indicating a preference of "uplifting songs when it's raining." In response, a digital search manager module generates a context rule based on the inputs. In one instance, the context rule is generated automatically and without user intervention by the system, e.g., using generative artificial intelligence (AI) techniques that leverage natural language understanding and machine-learning models.

The context rules support user customization that is not possible using conventional search techniques. Further, use of context rules supports a transition to use of machine-learning techniques. A transition from use of context rules to use of machine-learning models, for instance, overcomes technical challenges of "cold start" problems in machine-learning caused by lack of an adequate amount of training data to train a machine-learning model to have sufficient accuracy for operation in the real world.

A search engine, for instance, is configurable to include a plurality of context modules, each of which is configured as a profile to address a respective context. Examples of contexts include user contexts, biometric contexts, environmental contexts, digital content contexts, consumption contexts, calendar contexts, and other contexts as further described in relation to FIG. 2. Each of the context modules includes corresponding context rules that are usable to control searches for a corresponding context, e.g., to recommend upbeat songs during rainy weather in the above example. The context rules are used as a basis to generate rule search results, e.g., as a recommendation, locate items of interest, and so forth.

The plurality of context modules also includes, respectively, a plurality of machine-learning models. In an implementation, the plurality of machine-learning models is trained and retrained during use of the respective context rules over time. The training and retraining is used to generate search results based on context data received by the models, rule search results generated by the context rules, and subsequent user interaction with the rule search results. In this way, the context data and subsequent use of the context data is usable to train and retrain respective machine-learning models over time to increase accuracy in a latent representation of a pattern learned from the training data.

A transition module is also configurable as part of the search engine to control transition from use of the context rules to use of the machine-learning modules. The transition is performable in a variety of ways. In a first instance, the transition is controlled using weights to increase an amount of weight given to machine-learning search results from the machine-learning models over time. In a second instance, accuracy of the machine-learning model is determined (e.g., using a loss function) and a switchover is performed from use of the context rules to the machine-learning model, e.g., once accuracy as defined by a loss function has exceeded a specified threshold. Thus, in this example a transition point is detected to switch over from the context rules to use of the machine-learning models, which may be "phased in" over time, used to replace the context rules entirely, and so forth. As a result, a cold start problem is addressed while maintaining accuracy and improved user interaction.

In the second example, user interfaces are configurable to support specification of context usable to control which contexts are used as part of a search. The user interface, for instance, is configurable to include a first axis (e.g., a vertical axis) that is scrollable to navigate between representations of different contexts. Selection of the representations is also navigable along a second axis (e.g., a horizontal axis) to specify criteria for respective contexts.

The user interface, for instance, is scrollable vertically to a representation of a user context of "mood." Horizontal scrolling is then supported to select a particular mood that is to be used as a basis to perform the search. Similar functionality is also usable to specify criteria for generating a particular context rule, e.g., selection of context and then input of criteria to be used.

Search results generated from the search are then configured and output by a content configuration system of the search engine. A content configuration system, for instance, is leveraged to output the search result as a recommendation and include representations of contexts used to perform the search. The representations (e.g., icons) are indicative of contexts used to perform the search and are usable to modify search parameters for a subsequent search. As a result, these techniques improve search accuracy through addressing a search context, improve efficiency in computational resource consumption, and reduce power consumption. As a result, the techniques and systems described herein are configured to address a context, in which, a search is to be performed, which is not possible in conventional techniques.

Further discussion of these and other examples is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is a block diagram depicting a non-limiting example environment 100 of digital services configurable to implement search techniques that address context as described herein according to an implementation of the present subject matter. This example environment 100 includes a service provider system 102 and a client device 104 that are communicatively coupled, one to another, via a network 106.

Computing devices that implement the environment 100 are configurable in a variety of ways. A computing device, for instance, is configurable as a server, a desktop computer, a laptop computer, a mobile device (e.g., assuming a handheld configuration such as a tablet or mobile phone), an IoT device, a wearable device (e.g., a smart watch), an AR/VR device, and so forth. Thus, a computing device ranges from full resource devices with substantial memory and processor resources to low-resource devices with limited memory and/or processing resources. Although in instances in the following discussion reference is made to a computing device in the singular, a computing device may also represent any number of different computing devices, such as multiple servers of a server farm utilized to perform operations "over the cloud" as further described below.

The service provider system 102 includes a digital service manager module 108 that represents functionality usable to implement and manage operation of digital services 110. Digital services 110 are accessible remotely over the network 106 by the client device 104 using a communication module 112, e.g., a network-enabled application, plug-in module, browser, and so forth. A digital content consumption module 114, for instance, is executed at the client device 104 to access the digital services 110 and corresponding digital content 116 that is made accessible by the digital services 110, which is illustrated as stored in a storage device 118. The service provider system 102, as implementing a network platform, implements the digital services 110 through execution of software by respective servers or other hardware devices.

Digital services 110 are configurable to support a wide variety of functionality. In a first example, digital services 110 support social networking that is used to share the digital content 116 as digital images, videos, and status updates through corresponding profiles. In a second example, the digital services 110 support the digital content 116 as part of messaging and communication between corresponding client devices 104. In a third example, the digital services 110 support streaming of the digital content 116 to the client device 104 for respective profiles, e.g., streaming of digital audio (e.g., music, online books), digital video, and other digital content. In a fourth example, the digital services 110 support person-to-person transactions, e.g., payment processing.

An example of a digital service 110 (and functionality included as part of implementing the digital services) includes a search engine 120. In an example in which the search engine 120 is the digital service 110, the search engine 120 is usable to locate particular items of digital content 116 based on a search query. In an example in which the search engine 120 supports functionality of the digital service 110, the search engine 120 is used to locate items of digital content 116 in support of the digital services 110. A recommendation engine, for instance, is implemented by the search engine 120 to generate a search result as content-based recommendations, e.g., based on a user's past behavior and exhibited preferences, use of collaborative filtering, implemented to hybrid recommendations, and so forth.

As previously described, conventional search techniques suffer from technical challenges caused by use of a configuration that is typically generic to a user, and as such, conventional techniques are incapable of addressing a context, in which, a search request is generated. The inability to address the context decreases accuracy, results in inefficient use of computational resources, and increased power consumption. Consider a scenario in which a music recommendation is to be provided to the client device 104, a recommendation based solely on past user preferences as implemented by conventional techniques loses accuracy by its inability to address how the past user preferences were realized as well as a current context in which the recommendation is to be provided now.

To address these technical challenges, the search engine 120 is configured in these examples to address a context involving a search. Functionality to do so is represented by a context detection module 122, a rule generation module 124, a machine-learning system 126, and a context configuration system 128. The context detection module 122 is configured to address a context, in which, a search is to be performed and/or was performed. Context sensors 130 of the client device 104, for instance, detect a context and generate context data 132 that describes the context for communication over the network 106 to the digital service manager module 108. The context data is employed by the search engine 120 as insight Into a search to generate a search result 134 back to the client device 104. In a scenario in which the search result 134 is configured as a recommendation 136, the recommendation addresses a context, in which, the client device 104 is in, thereby improving accuracy. Context sensors 130 are usable to detect a variety of different contexts, an example of which is described in the following discussion and shown in a corresponding figure.

Figure 2:
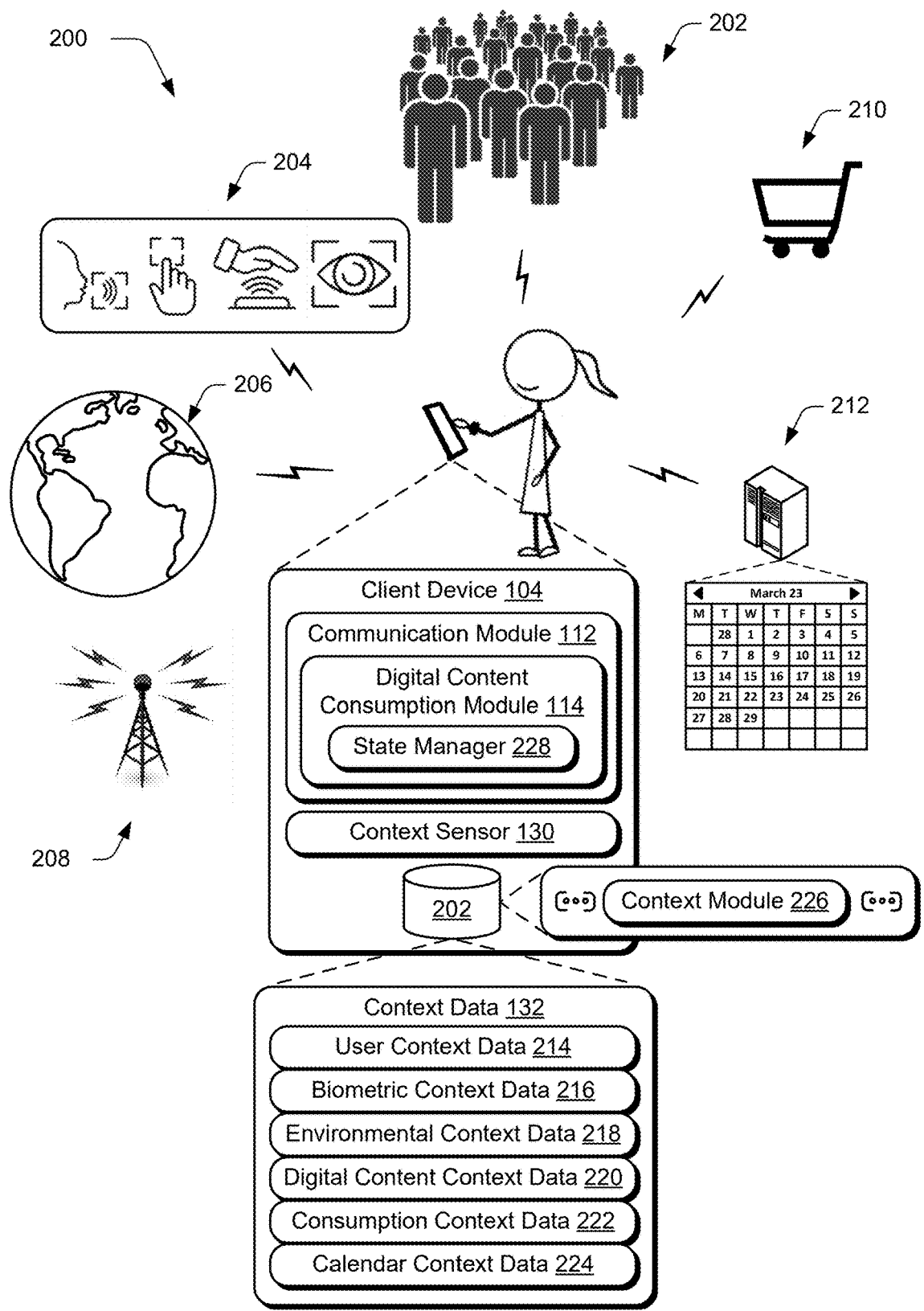
FIG. 2 is a block diagram depicting a non-limiting example system of context data generation based on a variety of contexts as described herein according to an implementation of the present subject matter.

FIG. 2 is a block diagram depicting a non-limiting example system 200 of context data generation based on a variety of contexts as described herein according to an implementation of the present subject matter. Context data 132 is configurable to describe a variety of contexts, in which, a search request is to be made and digital content resulting from the search request is to be consumed. Illustrated examples of contexts include a user context 202, biometric context 204, environmental context 206, digital content context 208, consumption context 210, and calendar context 212. Although not explicitly illustrated, other examples of contexts are also considered. Access to the context data 132 is user controllable (e.g., via a user interface) to manage permissions given to third parties to access context data associated with the user.

User context data 214 is generated to describe a variety of parameters involved in the user context 202. The user context 202, for instance, involves other users that are in proximity (e.g., a radius of five feet, twenty feet, one-hundred feet, etc.) to the client device 104, e.g., in order to generate a group recommendation. A context sensor 130, for instance, detects other client devices within a proximity of the client device 104 (e.g., using near field communication or other wireless connection, microphones, and so forth) and generates the user context data 214 to describe the existence of other client devices.

In a first example, the user context data 214 describes existence of other client devices but does not identify those devices. As such, in this example the user context data 214 is usable to infer that the client device 104 is in a group setting. In a second example, the user context data 214 identifies other client devices, e.g., by obtaining user identifiers of the other client devices associated with a digital service 110 used by both devices. The user context data 214 is therefore configurable to include the user ID such that preferences of the other users are also addressed as part of performing a search, e.g., using collaborative techniques. For example, a search using collaborative techniques may be based on characteristics of individuals identified in the group as well as contexts of the individuals. The search results, in this example, are configurable to reflect commonalities of shared group characteristics and contexts with increased prominence (or in place of) in the search results involving common characteristics and contexts of individuals in the group.

Biometric context data 216 is generated based on a biometric context 204 of the client device 104, and more particularly an entity associated with the client device 104. Biometric context data 216, for instance, is configurable to employ techniques to identify the entity, such as fingerprint recognition, facial recognition, and voice recognition. Biometric context data 216 is also configurable to describe biometric parameters of the entity, such as through heart rate monitoring, eye tracking, gait recognition, body temperature, blood oxygen levels, blood glucose levels, and so forth. In this way, biometric context data 216 is usable to describe a context of the entity itself, and from this, infer parameters of the entity, such as mood (e.g., happy, sad, agitated), activity level (e.g., exercising, lounging, working), health (e.g., healthy, feverish, lethargic), and so forth.

Environment context data 218 describes an environmental context 206 associated with the client device 104. The environmental context 206 includes a geographic location of the client device 104, e.g., based on context sensors 130 as implementing global positioning system (GPS) functionality. Environmental context 206 also includes weather and other environmental conditions. The environmental context 206, for instance, describes weather associated with a geographical location of the client device 104, e.g., "what is happening outside." In another example, the environmental context 206 describes an environment, in which, the client device 104 is currently disposed, e.g., a temperature of a room, size of a room, sound characteristics of a room, humidity levels, brightness levels, time-of-day, and so forth. The environment context data 218, for instance, indicates it is currently nighttime, a room is dark, and a temperature level is sixty-eight degrees. From this environment context data 218, the search engine 120 is configurable to readily infer that a corresponding entity is in the process of going to sleep.

In a digital content context 208, digital content context data 220 is generated to describe item preferences regarding digital content consumed by the client device 104. The digital content context data 220, for instance, is configurable to describe digital content item preferences over time. The digital content context data 220 is also usable to define other items of digital content that have been recently and/or are currently being consumed using the client device 104, and as such, provide a context for consumption of other items of digital content at that time.

In a consumption context 210, consumption context data 222 describes how digital content is to be consumed using the client device 104. The consumption context data 222, for instance, identifies types of devices to be used, e.g., headphones, speakers, tablet, large-screen television, and so forth. The consumption context 210 also describes user interaction with the client device 104, e.g., by monitoring user inputs to scroll a user interface, focus on a particular portion of a user interface, time spent with different user interfaces, and so forth. The consumption context data 222 is also usable to identify and support a handoff between devices associated with the entity that are to be used to consume the storage device 118, e.g., from an automobile to a house. Additionally, the consumption context data 222 is usable to identify supported formats, e.g., stereo, spatial audio such as Dolby® Atmos®, and so forth. As a result, the consumption context data 222 supports an ability to optimize search results for recommendations of digital content that maximize consumption and/or are even capable of consumption by the devices, i.e., is compatible.

The calendar context 212 and corresponding calendar context data 224 is representative of one of a variety of ways usable to leverage third-party services to further provide insight into a context of the client device 104. The calendar context data 224, for instance, is usable to define times and locations of corresponding events. Semantic processing through use of natural language understanding and machine learning is then usable to infer a context from the calendar context data 224.

Consider a scenario in which the calendar context data 224 indicates an upcoming trip to a different geographic location. The calendar context data 224 is therefore usable to provide a context for consumption of digital content at a point in time associated with the trip, as well as support functionality leading up to that point in time. In an instance in which the entity is to travel to a particular geographic location, the calendar context data 224 is usable to give greater weight to digital content included in recommendations associated with the particular geographic location over time leading up to (or away from) travel associated with the trip. The calendar context data 224 is also usable to address operational conditions, e.g., the calendar context data 224 indicates a geographic location that does not support continued network service and therefore digital content 116 (e.g., digital music) is downloaded and cached locally to the client device 104, automatically and without user intervention. A variety of other examples are also contemplated.

In an implementation, management of context data 132 for each of the contexts are addressed by a corresponding context module 226. The context module 226 functions as a context profile that addresses conditions to be used to control searches for those corresponding contexts. A state manager 228 is then usable to control transitions between the context modules 226, weighting to be employed for the different context modules 226, and so forth. The state manager 228, for instance, is usable to transition between the context modules 226 as implementing corresponding profiles based on which contexts are detected and defined by the context data 132. Further discussion of these and other examples is included in the following section and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Context Rules and Machine-Learning Models

The following discussion describes techniques that are implementable utilizing the previously described systems and devices. Aspects of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-8.

Figure 3:
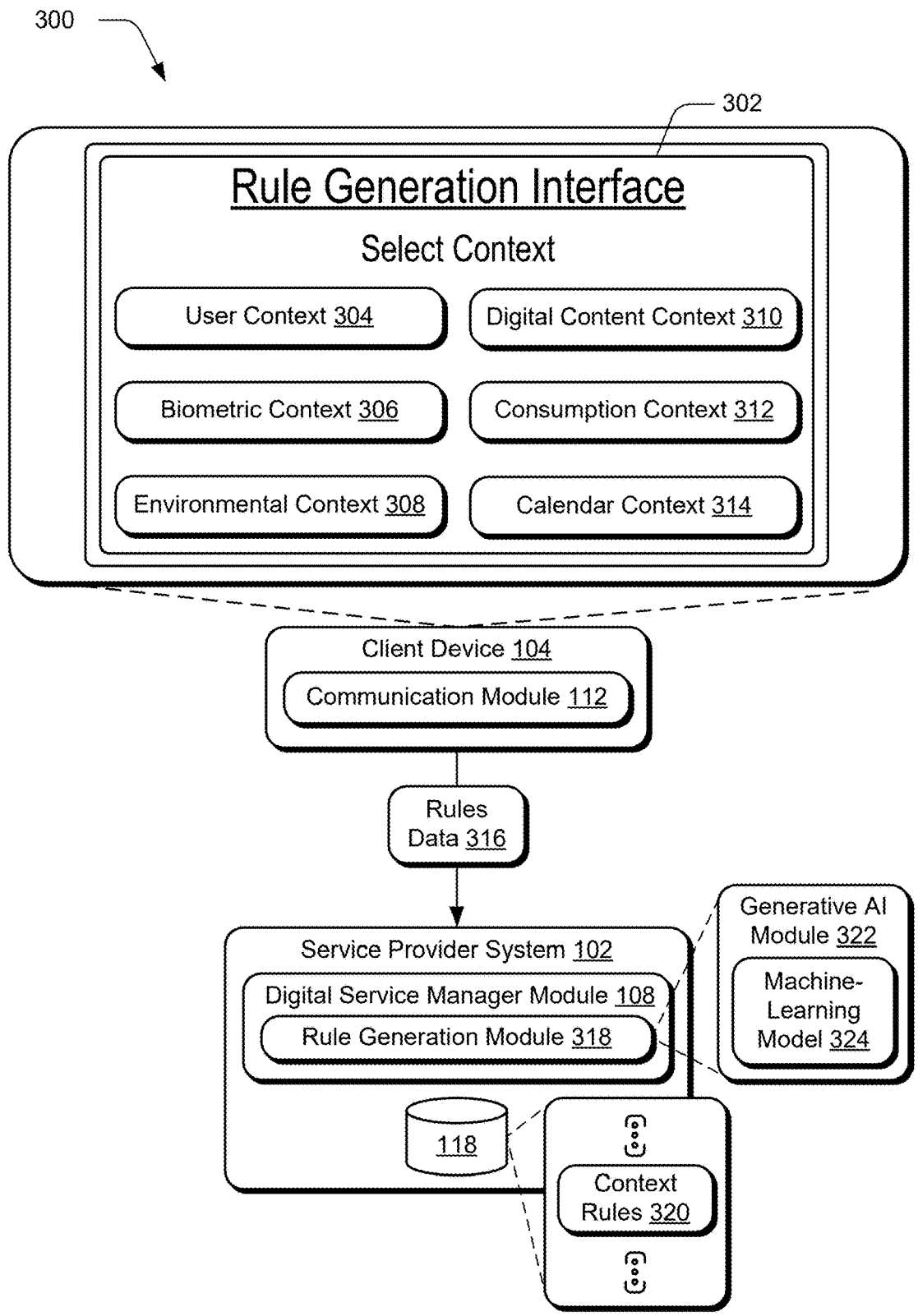
FIG. 3 is a block diagram depicting a non-limiting example system of a rule generation interface usable to generate context rules to address a variety of contexts as described herein according to an implementation of the present subject matter.

FIG. 3 is a block diagram depicting a non-limiting example system 300 of a rule generation interface 302 usable to generate context rules to address a variety of contexts as described herein according to an implementation of the present subject matter. In this example, the rule generation interface 302 includes a plurality of representations of contexts that are user selectable to provide inputs used to generate context rules. Examples of the representations include a user context 304 representation, a biometric context 306 representation, an environmental context 308 representation, a digital content context 310 representation, a consumption context 312 representation, and a calendar context 314 representation.

The rule generation interface 302, for instance, is generated and rendered by the communication module 112 in communication with the digital service manager module 108 via the network 106. Selection of a representation causes output of functionality configured to accept inputs to specify criteria to be used to control digital content search based on context, e.g., through selection of check boxes defining corresponding criteria. The criteria, for instance, is usable to specify preferences regarding particular contexts, which include both positive preferences (e.g., "prefer calming music while driving") and negative preferences (e.g., "avoid ambient music while working out").

In response to the inputs, the communication module 112 generates rules data 316 that is communicated over the network 106 to the service provider system 102. A rule generation module 318 is then employed by the digital service manager module 108 to generate context rules 320 based on the rules data 316, which is illustrated as stored in the storage device 118. The rule generation module 318 is configured to generate the context rules 320 in a variety of ways. In a first example, the rules data 316 describes explicit rules to be used as defined inputs and actions to be taken based on those inputs, e.g., "for heartrate over 80 bpm and located at gym play workout playlist."

In a second example, the rule generation module 318 employs a generative AI module 322 (artificial intelligence) that employs a machine-learning model 324 to generate the context rules 320, automatically and without user intervention. The generative AI module 322, for instance, collects a dataset of inputs having corresponding labels, e.g., of the contexts. The machine-learning model 324 of the generative AI module 322 is then trained and retrained using the collected data, e.g., as a generative adversarial network (GANs), variational autoencoders (VAEs), transformer modules, and so forth. In this way, the machine-learning model 324 learns a latent representation between inputs defined by the rules data 316 and outputs of the context rules 320. The latent representation is then usable to govern a relationship between the inputs and outputs, which may be refined over time through continued training.

Figure 4:
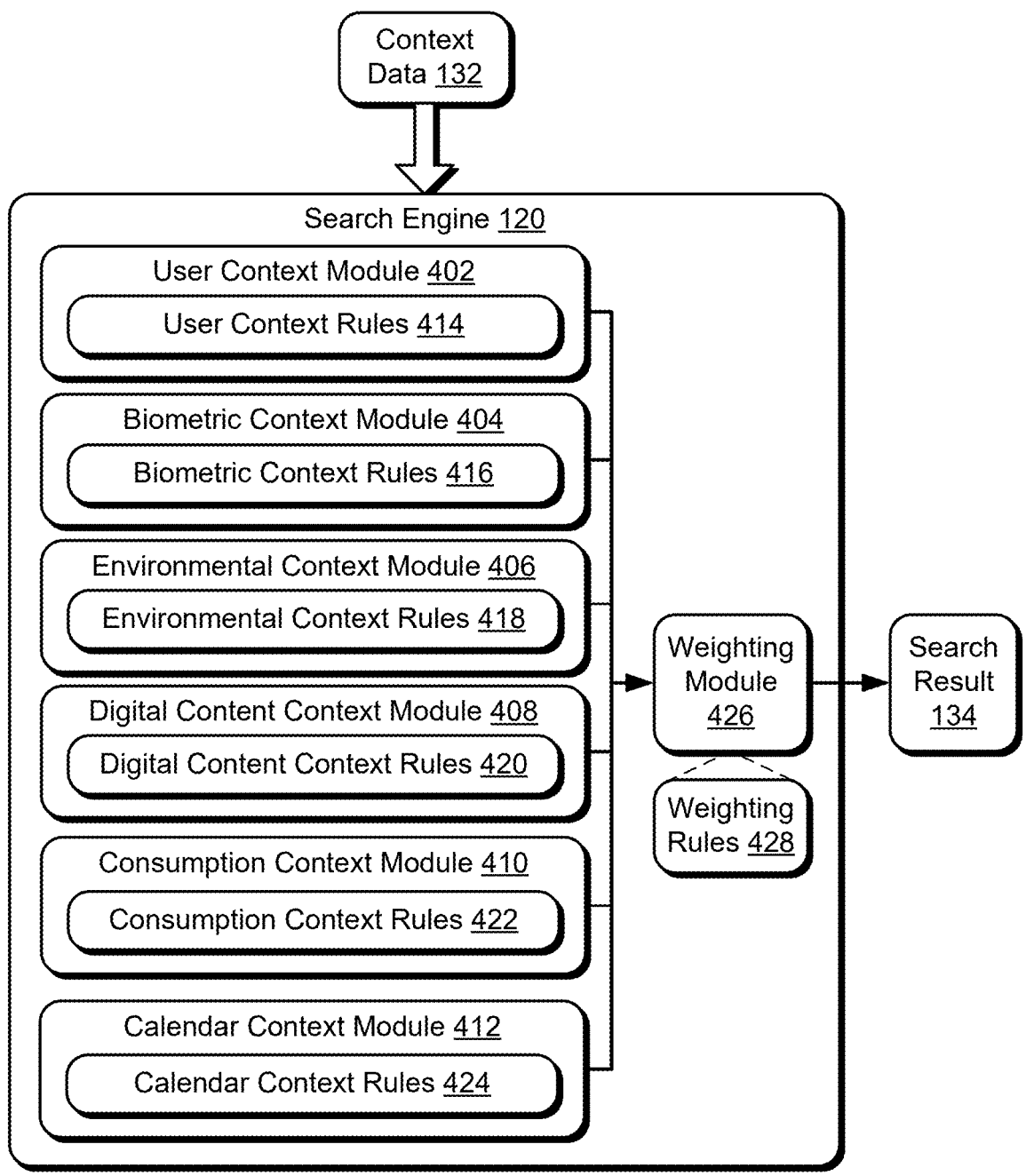
FIG. 4 is a block diagram depicting a non-limiting example system showing operation of a search engine in greater detail as employing context rules by respective modules to address context as part of search as described herein according to an implementation of the present subject matter.

FIG. 4 is a block diagram depicting a non-limiting example system 400 showing operation of a search engine in greater detail as employing context rules by respective modules to address context as part of search as described herein according to an implementation of the present subject matter. The search engine 120 includes a plurality of context modules configured to implement profiles of respective contexts using corresponding context rules.

As illustrated, examples of context modules include a user context module 402, a biometric context module 404, an environmental context module 406, a digital content context module 408, a consumption context module 410, and a calendar context module 412. Each of the context modules includes corresponding context rules utilized by the search engine 120 to address a corresponding context. Examples of context rules include user context rules 414, biometric context rules 416, environmental context rules 418, digital content context rules 420, consumption context rules 422, and calendar context rules 424.

The search engine 120 further includes a weighting module 426 that is configurable to implement weighting rules 428 as part of generating the search result 134. The weight rules 428, for instance, are also configurable through interaction with the user interface of FIG. 3 to specify positive or negative sentiments towards corresponding contexts. These sentiments are then used as a basis to set weights for corresponding contexts as part of the weighting rules 428. Consider a scenario in which a user wishes to give greater weight to environmental contexts (e.g., the weather) and less weight to a user context, e.g., whether other users are located proximal to the client device 104. The weighting rules 428 are therefore usable to give greater weight to search results received from the environmental context module 406 and less weight to search results received from the user context module 402 using weighting rules 428 by the weighting module 426.

Thus, the context rules are used to provide context to searches performed by the search engine 120. The context rules may be generated in a variety of ways, such as through a user interface output as described in FIG. 3 that is configured to accept inputs identifying a particular context and criteria to be used regarding that context. The user interface, for instance, may receive inputs regarding an environmental context of "weather" and specify criteria indicating a preference of "uplifting songs when it's raining." In response, the digital search manager module 108 generates a context rule based on the inputs. In some cases, the context rule is generated automatically and without user intervention by the system, e.g., using generative artificial intelligence (AI) techniques that leverage natural language understanding and machine-learning models. Once generated, the context rules support user customization of search based on context, which is not possible using conventional techniques. Additionally, the context rules are configurable for use in conjunction with machine-learning models, which is usable to address a cold start problem as further described in the following example.

Figure 5:
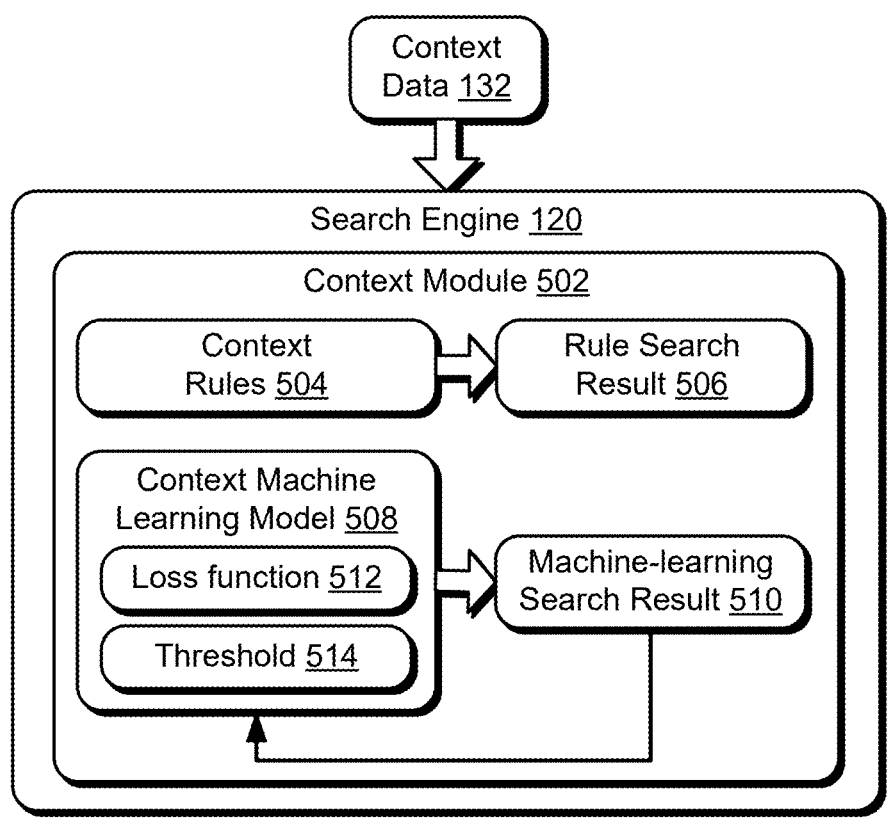
FIG. 5 is a block diagram depicting a non-limiting example system showing operation of a search engine in greater detail as employing context rules and machine-learning models as part of search as described herein according to an implementation of the present subject matter.

FIG. 5 is a block diagram depicting a non-limiting example system 500 showing operation of a search engine in greater detail as employing context rules and machine-learning models as part of search as described herein according to an implementation of the present subject matter. The context module 502 is representative of any one of the context modules as previously described in relation to FIG. 4. The context module 502 includes context rules 504 that are usable to generate a rule search result 506. The context rules 504, for instance, are generated based on user inputs, e.g., "automatically cache songs from playlists when calendar indicates upcoming air travel." In examples, the context rules 504 may include one or a combination of the user context rules 414, the biometric context rules 416, the environmental context rules 418, the digital context rules 420, the consumption context rules 422, the calendar context rules 424, and/or other context rules.

The context module 502 also includes a context machine learning model 508 that is configurable to generate a machine-learning search result 510. The context machine learning model 508, for instance, is configured to learn patterns and relationships from the context data 132 received and processed using the context rules 504. As a result, the context machine learning model 508 learns over time to generate a machine-learning search result 510 having increased accuracy and overcomes a "cold start" problem involved in model training.

A cold start problem in machine-learning model training occurs when a limited amount of training data is available to train the machine-learning model. Consequently, the machine-learning model has insufficient data to learn patterns and relationships between input features (e.g., the context data 132) and output features, e.g., the search result. Accordingly, use of the context rules 504 by the search engine 120 addresses the cold start problem through use of the context rules 504 initially during training of the context machine learning model 508 and then transitions toward use of the context machine learning model 508 once sufficient accuracy is achieved by the model.

The context machine learning model 508, for instance, includes a loss function 512 and a threshold 514. The loss function is a mathematical function that is used to measure a difference between a predicted output and an actual output by the context machine learning model 508. The loss function compares a predicted output with an actual output and calculates a numerical value that represents the difference between the values, which is known as the "loss." The loss function is used by the context machine learning model 508 to adjust parameters in order to minimize the loss.

In an implementation, an optimization algorithm is employed that computes a gradient of the loss function with respect to parameters of the context machine learning model 508. The gradient indicates an effect of an adjustment to the parameters on the loss and is used to adjust the parameters to train and retrain the context machine learning model 508 over time. Examples of loss functions include mean squared error (MSE), binary cross-entropy, and so forth. Accordingly, in this example a threshold 514 is specified that is predefined (e.g., via user input and/or determined automatically) that specifies a target accuracy of the context machine learning model 508 that is sufficient for use of the machine-learning search result 510 as part of generating an overall search result by the context module 502. Use of the context machine learning model 508, for instance, is configurable to transition over time, replace use of the context rules 504 when the threshold 514 is achieved, and so forth as further described in the following example.

Figure 6:
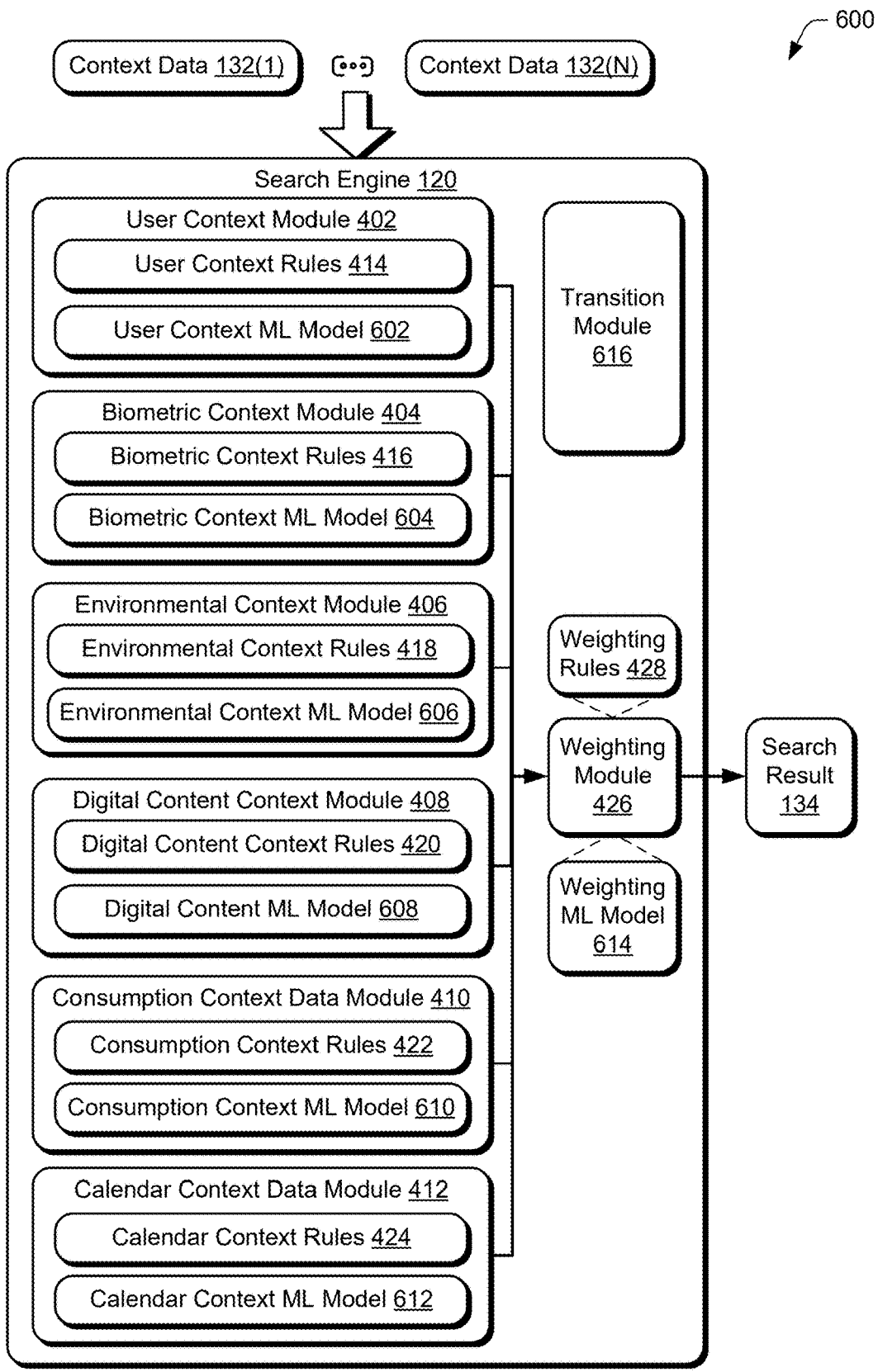
FIG. 6 is a block diagram depicting a non-limiting example system showing operation of a search engine in greater detail as employing context rules as part of training machine-learning models of respective context modules over time as part of search as described herein according to an implementation of the present subject matter.

FIG. 6 is a block diagram depicting a non-limiting example system 600 showing operation of a search engine 120 in greater detail as employing context rules as part of training machine-learning models of respective context modules over time as part of search as described herein according to an implementation of the present subject matter. The search engine 120 includes a user context module 402, a biometric context module 404, an environmental context module 406, a digital content context module 408, a consumption context module 410, and a calendar context module 412 as previously described. Each of the context modules includes corresponding context rules utilized by the search engine 120 to address a corresponding context. Examples of context rules include user context rules 414, biometric context rules 416, environmental context rules 418, digital content context rules 420, consumption context rules 422, and calendar context rules 424. A weighting module 426 is also included that is configurable to include weighting rules 428 to apply weights to rule search results generated by respective context rules in the generation of the search result 134.

The search engine 120 receives context data over time, which is illustrated as context data 132(1), . . . , context data 134(N). The context data 132(1)-134(N) is processed by respective context rules as part of generating the search results 134. The context data 132(1)-134(N) is also employed as part of training respective machine-learning models, illustrated as "ML model" in FIG. 6. The context modules, for instance, include respective machine-learning models, examples of which are illustrated as user context ML model 602, biometric context ML model 604, environmental context ML model 606, digital context ML model 608, consumption context ML model 610, and calendar context ML model 612. The weighting module 426 also employs a weighting ML model 614 that is trainable and retrainable over time to adjust weights applied to search results from respective modules in order to generate the search result 134.

A transition module 616 is also employed by the search engine 120 to control an amount of contribution the context rules and the machine-learning models have, respectively, toward generating the search result 134. In some examples, the transition module 616 is employed globally to control transition from use of context rules to machine-learning models. The transition is performable "all at once" to cause use of the machine-learning models to replace use of the context rules. The transition is also performable as part of phased-in use of the machine-learning models. The weighting ML model 614, for instance, is usable to employ a loss function and threshold as previously described in relation to FIG. 5 to increase a contribution (e.g., as an amount of weight given) to machine learning search results as accuracy is increased by respective machine learning models.

In some examples, the transition module 616 is employed locally by individual context modules to control an amount of contribution the context rules and the machine-learning models have, respectively, toward generating a search result by a respective module. Like the global example, the transition module 616 is employed to control transition from use of context rules to machine-learning models but is performed locally and individually within the respective context modules. The transition is performable "all at once" to cause use of the machine-learning models to replace use of the context rules. The transition is also performable as part of phased-in use of the machine-learning models, e.g., to give greater weights to the machine-learning models over time.

Figure 7:
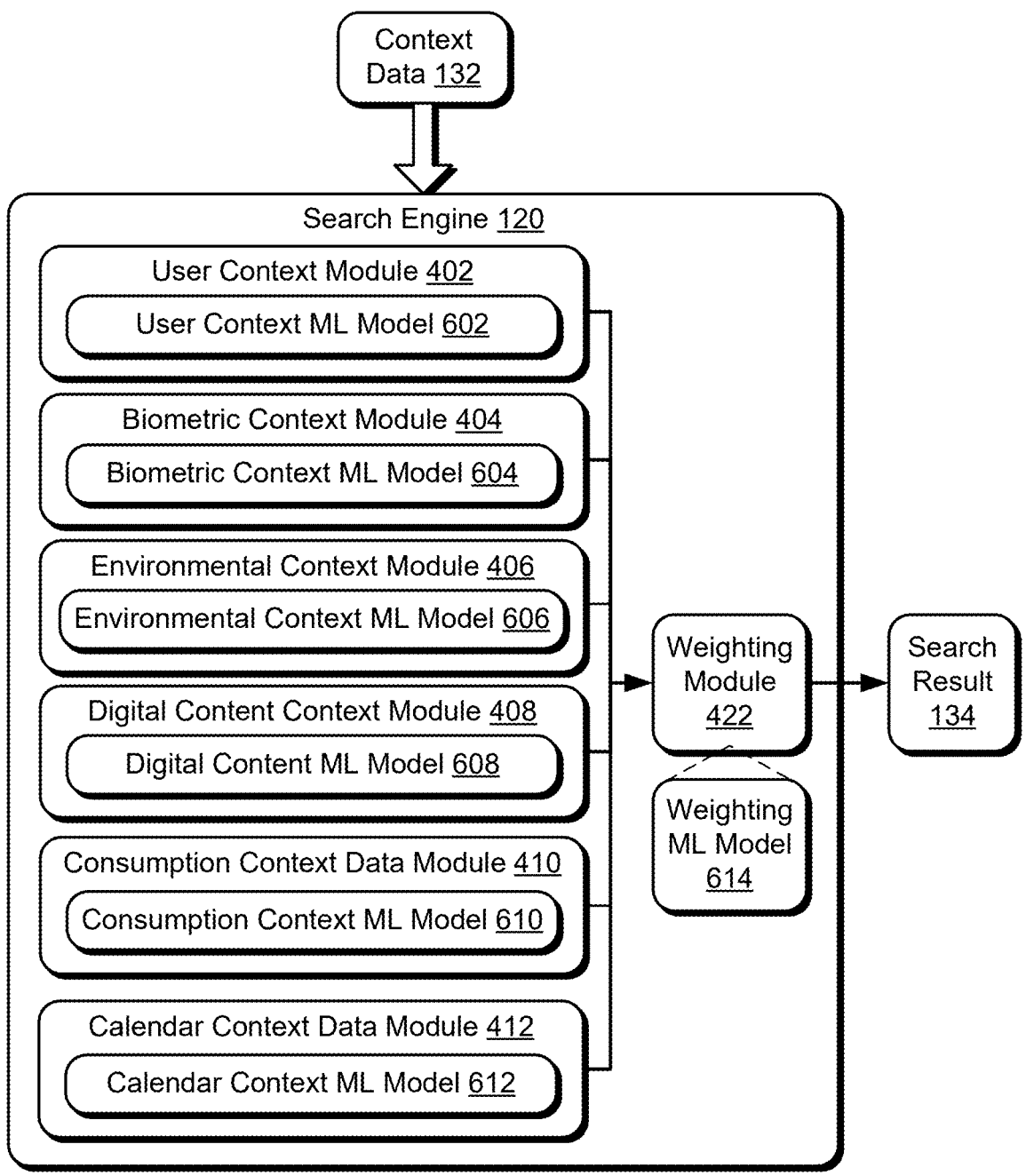
FIG. 7 is a block diagram depicting a non-limiting example system showing operation of a search engine in greater detail as employing use of machine-learning models to replace use of context rules as part of search as described herein according to an implementation of the present subject matter.

FIG. 7 is a block diagram depicting a non-limiting example system 700 showing operation of a search engine 120 in greater detail as employing use of machine-learning models to replace use of context rules as part of search as described herein according to an implementation of the present subject matter. In this example, use of the machine-learning models has been used to replace use of context rules by respective context modules through configuration as an ensemble model.

Continuing with the previous discussion of FIG. 6, this replacement is performable globally in which use of context rules by the context modules is performed concurrently with use of the machine-learning models. A transition between the context rules and machine-learning models is also performable individually for the respective context modules. A variety of other examples are also contemplated, including continued use of the context rules along with the machine-learning models in support of manual user customization and personalization.

Figure 8:
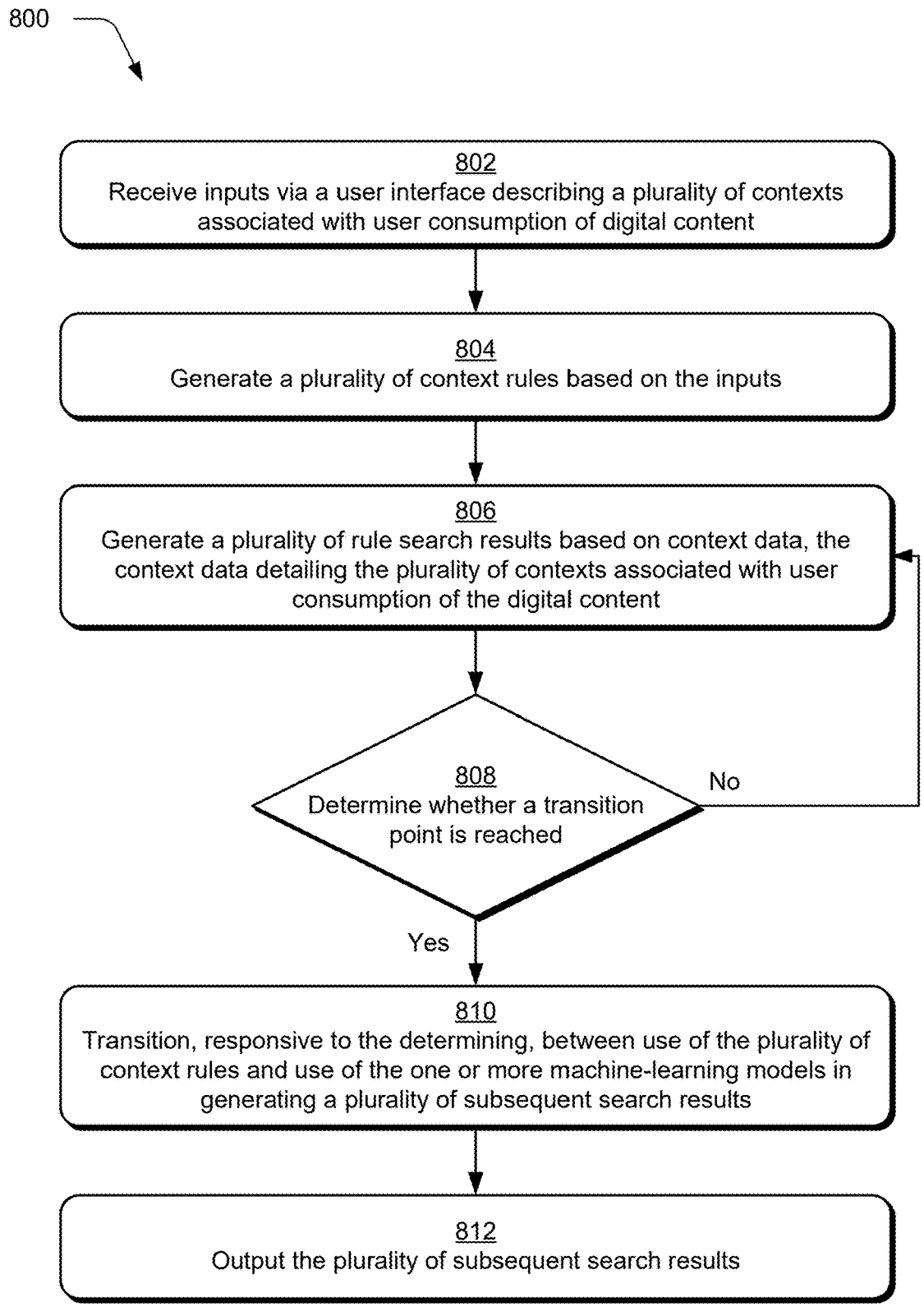
FIG. 8 is a flow diagram depicting a non-limiting example procedure describing use of a transition point as part of a transition from use of context rules to machine-learning models as part of search as described herein according to an implementation of the present subject matter.

FIG. 8 is a flow diagram depicting a non-limiting example procedure 800 describing use of a transition point as part of a transition from use of context rules to machine-learning models as part of search as described herein according to an implementation of the present subject matter. To begin in this example, inputs are received via a user interface. The inputs describe a plurality of contexts associated with user consumption of digital content (block 802). The inputs, for instance, are received via a rule generation interface 302 output by the client device 104. Rules data 316 generated from interaction with the interface are communicated from the client device 104 to the digital service manager module 108 of the service provider system 102 via a network 106.

A plurality of context rules is generated based on the inputs (block 804). A rule generation module 318, for instance, is configurable to generate the rules from explicit rule definitions included in the rules data 316, e.g., "play Band X for wakeup on workdays." In another example, the rule generation module 318 employs generative AI techniques as part of natural language understanding, which is usable to infer an underlying intent of rules data 316 generated from user interaction with the rule generation interface 302. The rules data 316, for instance, may indicate individual likes and times for particular types of music and the context rules 320 are generated as abstractions of patterns exhibited by the likes and times, e.g., a preference of instrumental music during a holiday season and rock anthems during the summer.

A plurality of rule search results is generated based on context data. The context data details the plurality of contexts associated with user consumption of the digital content (block 806). Context rules 504, for instance, are used to generate rule search results 506 based on the context data 132.

A determination is then made as to whether a transition point is reached (decision block 808). During use of the context rules 504, for instance, a context machine learning model 508 is trained based on the context data 132, the rule search result 506, and subsequent user interaction with the rule search result 506. Training of the context machine learning model 508 is therefore usable to determine patterns and also accuracy in rule search result 506 generated by the context rules 504. Over time, a determination is made as to whether a threshold 514 has been reached for a loss function 512 of the context machine learning model 508, e.g., that the context machine learning model 508 has reached a target level of accuracy. If the transition point has not been reached ("no" from decision block 808), generation of the rule search results continues (block 806).

If the transition point has been reached ("yes" from decision block 808), a transition is performed, responsive to the determination, between use of the plurality of context rules and use of the one or more machine-learning models in generating a plurality of subsequent search results (block 810). As previously described, the transition is performable "all at once" or may be "phased in" over time. The plurality of subsequent search results is then output (block 812), e.g., as a recommendation, a targeted advertisement, located items from a plurality of items, and so forth.

In this way, the techniques described herein overcome technical challenges of conventional search techniques that are not able to address a context involved in a search. Conventional techniques, for instance, are incapable of addressing a specific situation of the user, such as location of the user, activity engaged in by the user, other users in the vicinity of the user, and so forth. Consequently, search results are not able in conventional techniques to address context and changes in context, e.g., for song recommendations that do not change as the user's context changes.

Accordingly, context-based search techniques are described herein that leverage modeling and location information in support of search, e.g., for targeted music recommendations, caching, and profile tracking. Profiles, for instance, are implemented as respective context modules, e.g., as a user context module 402, a biometric context module 404, an environmental context module 406, a digital content context module 408, a consumption context module 410, and a calendar context module 412. The search engine 120 is then tasked with determining which context modules are to be used to guide a search. A state manager 228 is used by the digital content consumption module 114 to manage changes in context and thus which context modules are used (and more particularly weights applied to search results from the context modules) in generating a search result. As a result, the search engine 120 is usable to address a variety of scenarios, such as when a group of users is at a same location.

Search results generated by the context modules are thus implemented in a manner similar to a Venn diagram to address changes to context and thus corresponding states used to generate the search result. For example, collective recommendations are generated by the search engine 120 when a group of people are included at a same location through use of context rules and/or machine-learning models pertaining to the group of people. Collective recommendations are thus changeable over time by a state manager 228, e.g., as users and corresponding interests change as reflected by the context rules and/or machine-learning models. A ranking system is also employable by the search engine 120 as part of configuring search results, e.g., to rank search results based on user, device, playlist priority, and so forth.

The state manager 228 is also configurable to use transition modes to detect and address a change in states, e.g., as a physical handoff between client devices. In one example, the handoff is performed as mimicking a search request from one device to another, or the device is woken up and an option provided to confirm sending of the request to transition to a different device. In a caching example, context is also utilized to leverage location and/or situation. For example, when returning home in the car, the digital content consumption module 114 predicts a transition to a home speaker system from an automobile and "wakes up" the home speaker system and caches a next portion of a song for a handoff. Another example includes a handoff between devices disposed at different floors of a residence as a user is detected moving between floors. Use of the search is also configurable to address consumption and context over time, such as generation of a "year in review" playlist based on combinations of context modules.

The search engine 120 is configurable to also infer additional contexts based on detected contexts. In a passive model, for instance, users may not articulate feelings. However, these feelings may be inferred based on context detected by the context sensors 130 (e.g., detecting a screaming child as well as increased heart rate) and respond accordingly, e.g., play calming music. These techniques further support real time output to adapt to context changes as the changes occur.

Context-Based User Interface Weighting

The following discussion describes context-based user interface weighting techniques that are implementable utilizing the previously described systems and devices. Aspects of the procedure are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 9 and 10.

In the previous section, machine-learning models are trainable to learn patterns from context data 132 to address different contexts. To address cold start problems, a variety of techniques may be employed. In a first example, context rules are used as part of training the machine-learning model over time. In a second example, pretrained models are initially used and then adapted over time based on monitored user interaction.

Figure 9:
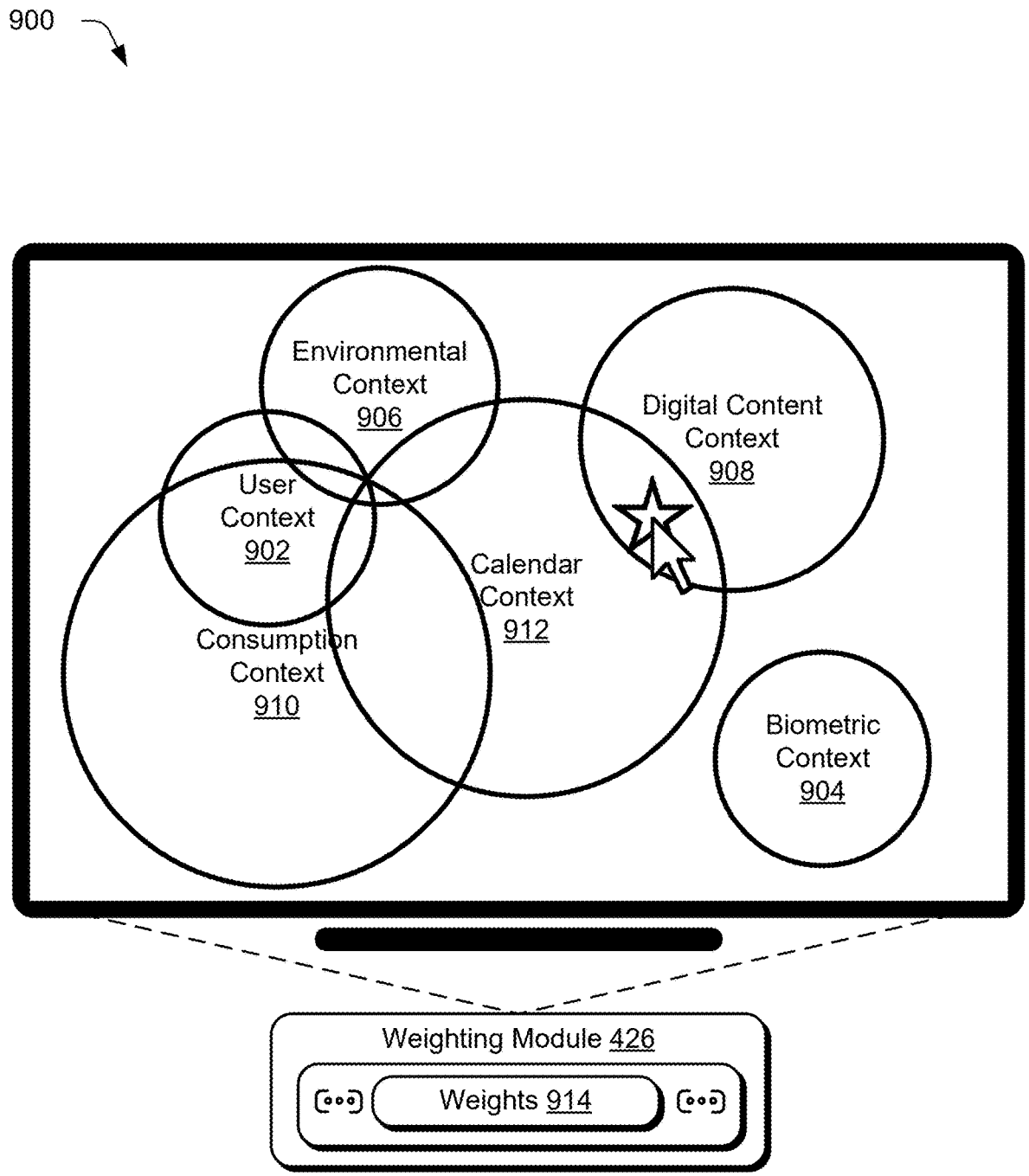
FIG. 9 is an illustration depicting a non-limiting example of a user interface including overlapping representations of contexts usable to specifying logical relationships including weighting for use as part of a context-based search as described herein according to an implementation of the present subject matter.
Figure 10:
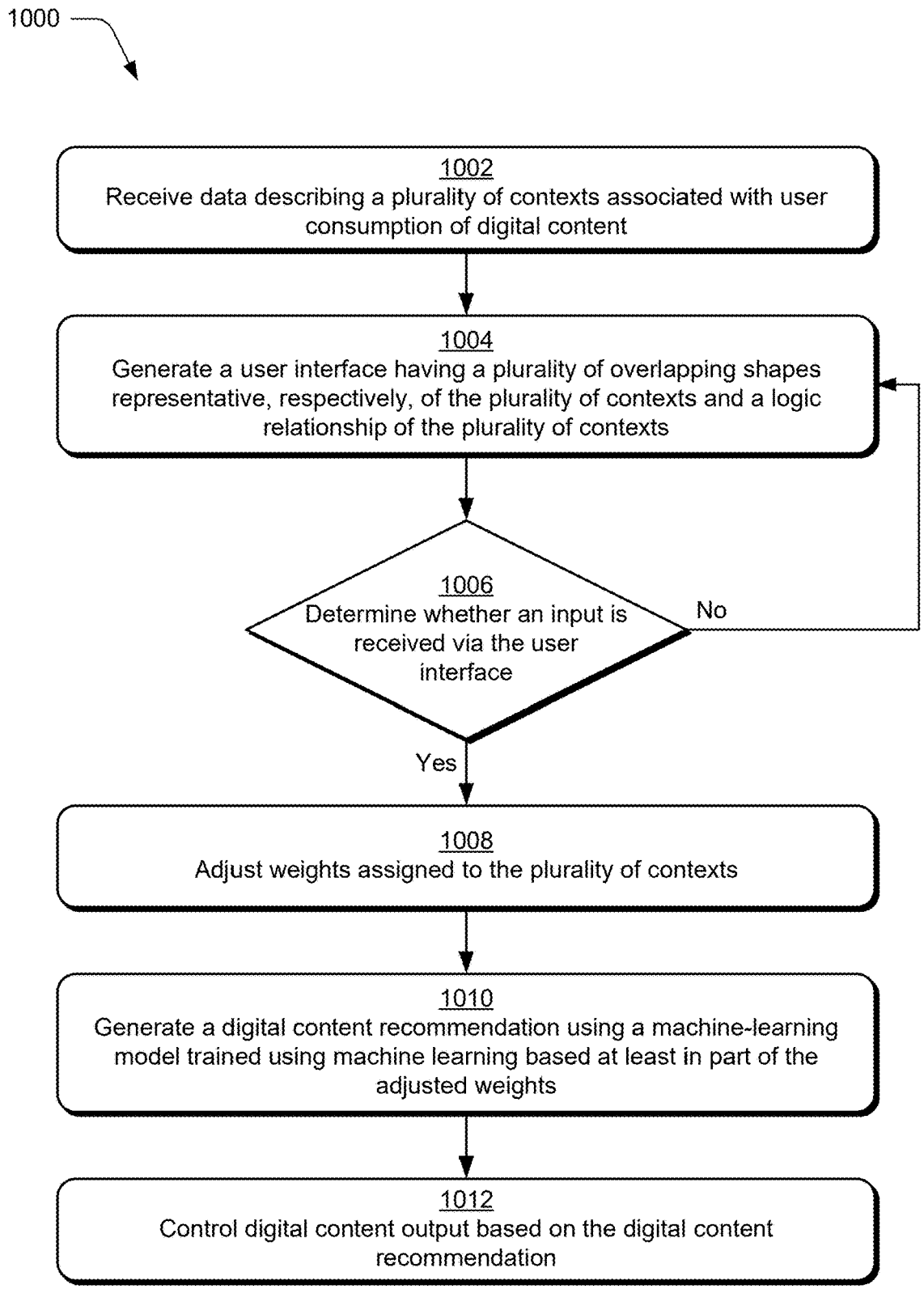
FIG. 10 is a flow diagram depicting a non-limiting example procedure describing use of a user interface to adjust weights as part of search as described herein according to an implementation of the present subject matter.

FIG. 9 is an illustration depicting a non-limiting example of a user interface 900 including overlapping representations of contexts usable to specify logical relationships including weighting for use as part of a context-based search as described herein according to an implementation of the present subject matter. FIG. 10 is a flow diagram depicting a non-limiting example procedure 1000 describing use of a user interface (e.g., the user interface 900) to adjust weights as part of search as described herein according to an implementation of the present subject matter.

A multitude of different contexts may be encountered that are usable to guide performance of a search. As such, these multitude of different contexts provide additional challenges in addition to addressing the contexts, themselves, but also how these contexts affect each other. Accordingly, a context-based user interface weighting is described in this example to support definition of relationships and weighting of different contexts on each other in generation of a search result. These techniques are usable to define relative weights and combinations of contexts to be used in generating a search result, whether using context rules and/or machine-learning models.

To begin in this example, data is received that describes a plurality of contexts associated with user consumption of digital content (block 1002). The data, for instance, is configurable as context data 132 used as a basis to generate search results and/or train machine-learning models. The data is also configurable to identify context modules (i.e., context profiles) used by the search engine 120 to address context as part of search.

A user interface 900 is generated having a plurality of overlapping shapes that are representative, respectively, of the plurality of contexts and a logical relationship of the plurality of contexts (block 1004). As shown in FIGS. 4-7, examples of context modules include a user context module 402, a biometric context module 404, an environmental context module 406, a digital content context module 408, a consumption context module 410, and a calendar context module 412. Accordingly, in this example the user interface includes a user context 902 representation, a biometric context 904 representation, an environmental context 906 representation, a digital content context 908 representation, a consumption context 910 representation, and a calendar context 912 representation.

The representations, for instance, have a logical relationship based on an overall size indicative of respective weights 914 to be applied by a weighting module 426 that is generating the search result 134. In the illustrated example, a consumption context 910 representation and a calendar context 912 representation have sizes that are greater than those taken by a user context 902 representation, biometric context 904 representation, environmental context 906 representation, and a digital content context 908 representation.

Overlaps of the representations are also used to indicate logical relationships of the contexts to each other in the user interface 900. In the illustrated example, a user context 902 representation and a consumption context 910 representation have significant overlaps indicating a logical relationship of those contexts to each other. Accordingly, the user context and the consumption context are usable together in the generation of a search result. However, the biometric context 904 representation does not include an overlap with another context representation, thus indicating that this context is to be addressed independently of other contexts.

A determination is then made as to whether an input is received via the user interface (decision block 1006) as adjusting the logical relationship. If the determination indicates an input is not received ("no" from decision block 1006), generation of the user interface continues (block 1004).

If the determination indicates an input is received ("yes" from decision block 1006), weights assigned to the plurality of contexts are adjusted (block 1008) based on the adjustment to the logical relationship. An adjustment of size of the respective representations, for instance, is usable to adjust weights given to respective contexts by the weighting module 426 as part of generating the search results. An adjustment made to an overlap of the representations is usable to control how contexts are usable to affect each other. An amount of an overlap, for instance, between representations is usable to control how much one context is usable to affect another context in generating a search result.

A digital content recommendation is then generated using a machine-learning model trained using machine learning based at least in part on the adjusted weights (block 1010). The machine-learning models as shown in FIG. 7, for instance, are each used to generate a respective machine-learning search result. The machine-learning search results are then weighted based on the adjusted weights, a result of which is the search result 134. Digital content output is then controlled based on the digital content recommendation (block 1012), such as to stream particular items of digital music as indicated by the digital content recommendation.

As a result, the overlapping representations provide a control mechanism to generate search results (e.g., as digital content recommendations in this example) by leveraging the representations as a Venn diagram. Adjustments to the overlapping representations are used to adjust weights applied to respective contexts. These techniques also support an ability to "explore" an effect of different combinations and overlap at a feature space defined by the representations. In the illustrated example, a user input received via a cursor control device indicates a point (illustrated using a star) in an overlap between a calendar context 912 and a digital content context 908. This point is usable to surface search results having corresponding weights and overlaps of these contexts. A variety of other examples are also contemplated.

Further, these techniques are usable to support inclusion of additional context information, e.g., from other users by incorporating weights for respective contexts of the other users. Representations and corresponding contexts, for instance, are combinable for multiple users in a similar manner to form combined search results. These techniques are also usable to specify weights to be used for weighting rules 428 to weigh outputs of context rules in generating a search result 134, thereby providing an efficient and intuitive input mechanism.

Context-Based User Interface Output

Figure 11:
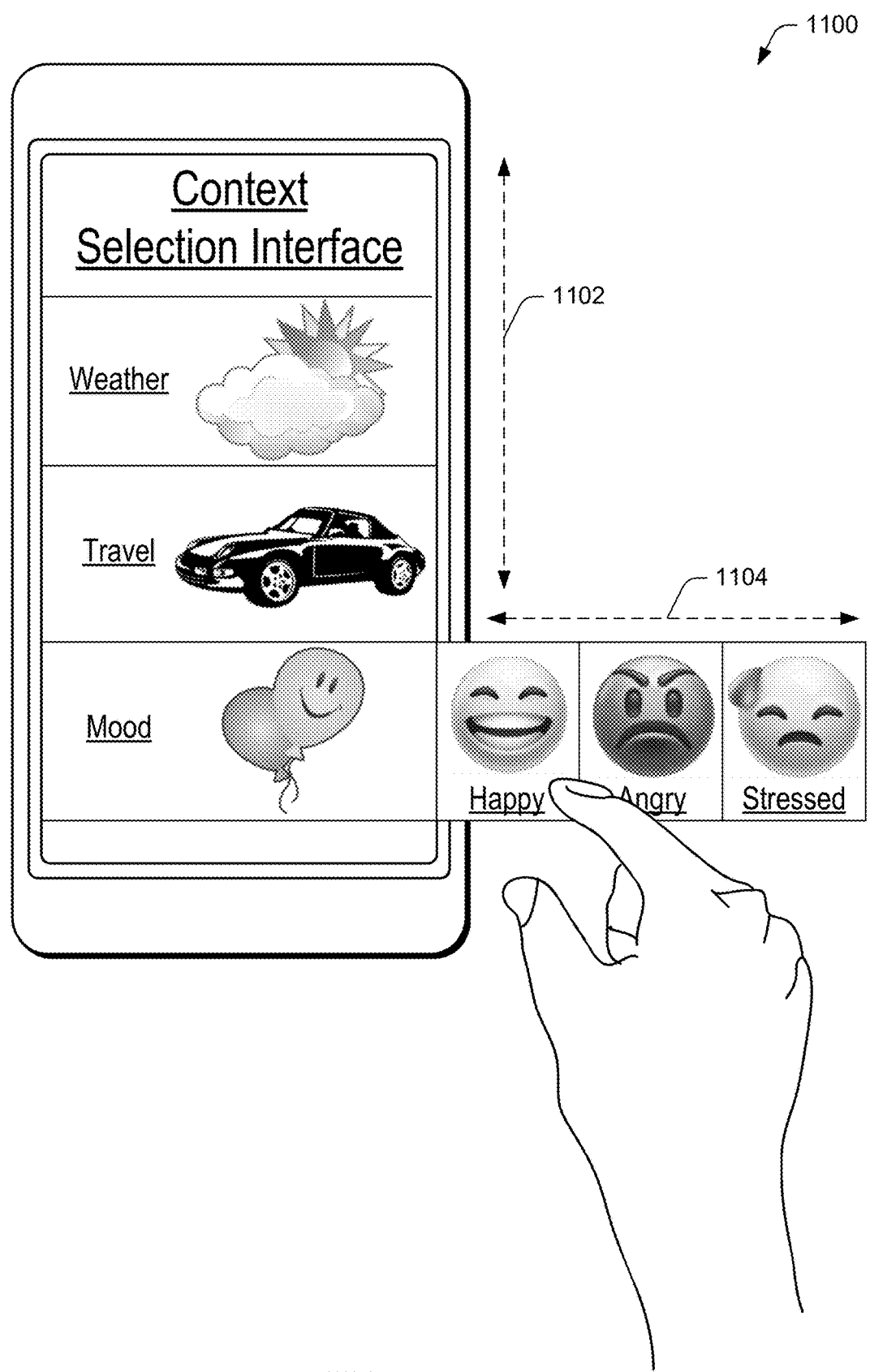
FIG. 11 is an illustration depicting a non-limiting example of a user interface configured to specify particular context for use as part of search as described herein according to an implementation of the present subject matter.
Figure 12:
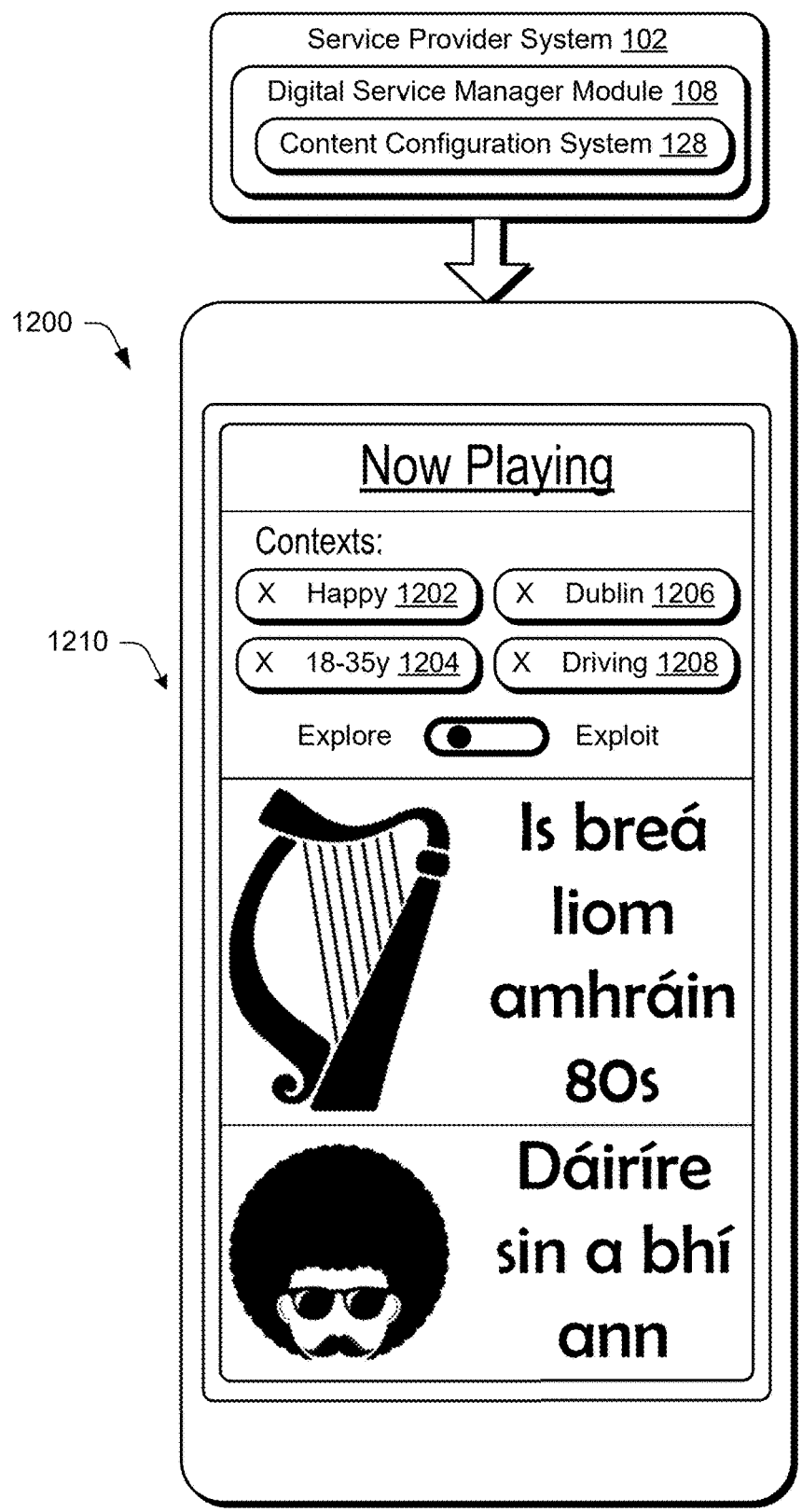
FIG. 12 is an illustration depicting a non-limiting example of a user interface configured to display a search result including representations of contexts used to perform the search as described herein according to an implementation of the present subject matter.
Figure 13:
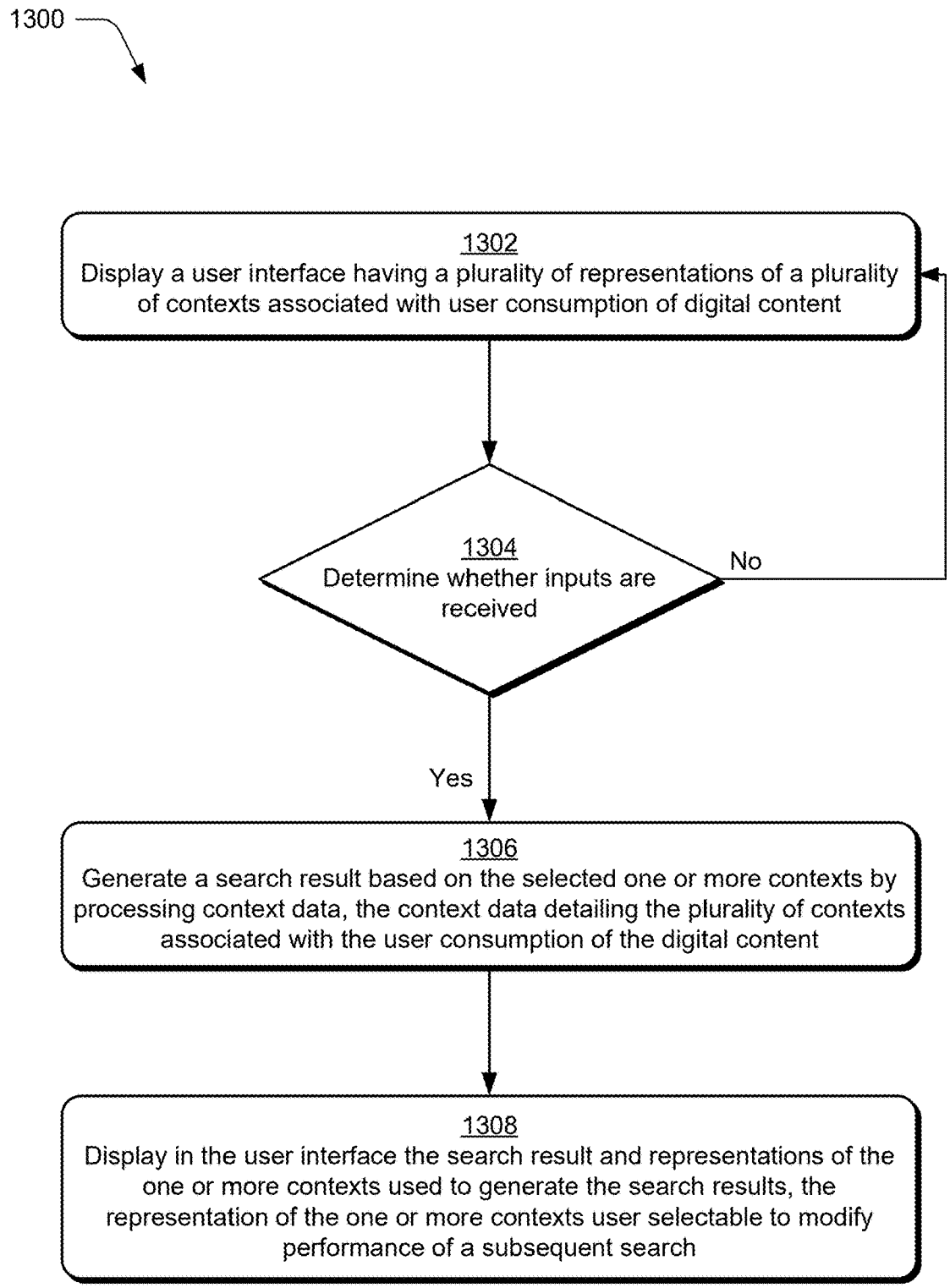
FIG. 13 is a flow diagram depicting a non-limiting example of a procedure in an example implementation of context-based search as described herein according to an implementation of the present subject matter.

FIG. 11 is an illustration depicting a non-limiting example of a user interface 1100 configured to specify a particular context for use as part of search as described herein according to an implementation of the present subject matter. FIG. 12 is an illustration depicting a non-limiting example of a user interface 1200 configured to display a search result generated responsive to the search initiated in FIG. 11, the search result including representations of contexts used to perform the search as described herein according to an implementation of the present subject matter. FIG. 13 is a flow diagram depicting a non-limiting example of a procedure 1300 in an example implementation of context-based search as initiated as depicted in FIG. 11 to generate a search result as depicted in FIG. 12 as described herein according to an implementation of the present subject matter.

The following discussion describes context-based user interface output techniques that are implementable utilizing the previously described systems and devices. Aspects of the procedure are implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 11-13. In this discussion, examples are described of a user interface that is usable to specify contexts for use in generating a search result and a user interface configurable to output a search result.

To begin in the first example of FIG. 11, a user interface 1100 is displayed. The user interface 1100 includes a plurality of representations of a plurality of contexts associated with user consumption of digital content (block 1302). The user interface 1100 includes a first axis 1102 (e.g., a vertical axis) that supports user navigation through representations of a plurality of contexts, examples of which include "weather," "travel," and "mood." The user interface 1100 also includes a second axis 1104 (e.g., a horizontal axis) that supports user navigation to specify criteria relating to a particular context, e.g., "happy," "angry," and "stressed" for the "mood" context. In this way, user inputs are readily provided to specify contexts and corresponding criteria (i.e., parameters) for guiding performance of a search.

A determination is then made by the search engine 120 as to whether inputs are received (decision block 1304). If inputs are not received ("no" from decision block 1304), display of the user interface continues by the search engine 120.

Upon a determination that user inputs are received ("yes" from decision block 1304), a search result is generated by the search engine 120 based on one or more contexts that are selected by processing context data. The context data details a plurality of contexts associated with the user consumption of the digital content (block 1306). In this illustrated example, a user input specifies a "happy" parameter for a "mood" context. Other examples are also input, including a parameter "18-35 y" for a context "age," a parameter "Dublin" for a context "location," and a parameter "driving" for an environmental context. The search engine 120 then performs a search based on these contexts, e.g., to locate digital music for streaming to the client device 104 from digital services 110 of the service provider system 102.

In response, a digital service manager module 108 utilizes a context configuration system 128 to configure the search results for display in the user interface 1200. The search results include representations of digital content located as part of the search (e.g., digital music for streaming and/or download) and representations of the contexts used to perform the search, examples of which include Happy 1202, 18-35 y 1204, Dublin 1206 and Driving 1208. The representations of the one or more contexts are user selectable to modify performance of a subsequent search (block 1308). User inputs, for instance, are usable to select representations for addition to and/or removal from use as part of a search, which are then used as a basis to perform a subsequent search. User inputs are also usable to control a weight assigned to a particular context. A control, e.g., a slider control, is output in the user interface responsive to selection of a representation of a corresponding context, e.g., as a "press and hold," a "hover" using a cursor control device, and so on. The control, once output, is configured to then receive user inputs to set an amount of weight given to a respective content.

An option 1210 is also included in the user interface 1200 that is user selectable to control an amount of exploration or reward that is to be used to generate the search result and the generating of the search result is based on the amount. Exploration and reward are mechanisms usable by the search engine 120 as part of search. Exploration is a mechanism used to search for new and unexplored areas of a search space. In exploration, the mechanism is used to select candidates that have not been encountered before. Regarding the reward, the mechanism is used to leverage known areas of a search space. Optimization functions are usable as part of exploration and reward to maximize an ability to locate new search results as well as maximize overall user utility. An example of a technique usable to address both exploration and reward includes a Monte Carlo technique in which options are modeled accordingly to a likelihood of reward by different random outcomes, e.g., by simulating outcomes of a plurality of slot machines. These mechanisms may be leveraged in combination with monitored user interaction. The optimization function, for instance, detects inputs to skip new songs output due to exploration and in response increases a weight towards reward to return to songs having increased familiarity. Accordingly, in this example the option is user selectable to control an amount of exploration in order to discover new music types and reward to maximize a reward to a user in receiving music types of interest.

In the above discussion, techniques and systems are described to overcome these technical challenges in support of context-based search. In some examples, context rules and machine learning are employed to support a search context, user customization, and address a "cold start" problem. In some cases, user interfaces are configurable to support specification of context usable to control which contexts are used as part of a search. The user interfaces are also configurable to include representations (e.g., icons) indicative of contexts used to perform the search which support user interaction to modify search parameters for a subsequent search. As a result, these techniques improve search accuracy through addressing a search context, improve efficiency in computational resource consumption, and reduce power consumption.

Example System and Device

Figure 14:
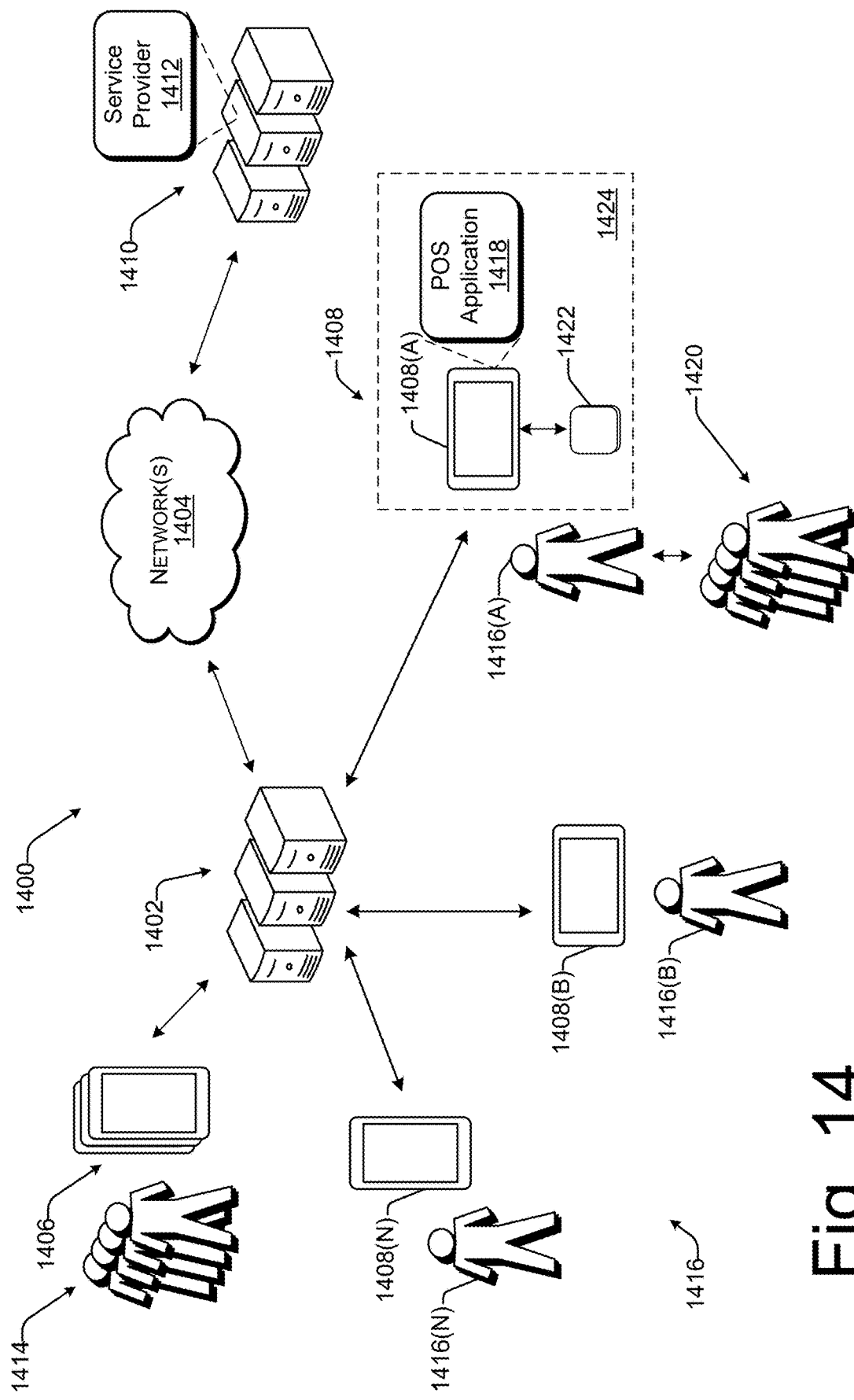
FIG. 14 is an example environment with which techniques described herein can be implemented, according to an embodiment described herein.

FIG. 14 illustrates an example environment 1400. The environment 1400 includes server(s) 1402 that can communicate over a network 1404 with user devices 1406 (which, in some examples can be merchant devices 1408 (individually, 1408(A)-1408(N))) and/or server(s) 1410 associated with third-party service provider(s). The server(s) 1402 can be associated with a service provider 1412 that can provide one or more services for the benefit of users 1414, as described below. Actions attributed to the service provider 1412 can be performed by the server(s) 1402. The service provider 1412, for instance, is an example of a service provider system 102 of FIG. 1.

The environment 1400 can include a plurality of user devices 1406, as described above for client device 104. Each one of the plurality of user devices 1406 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1414. The users 1414 can be referred to as customers, buyers, merchants, sellers, borrowers, employees, employers, payors, payees, couriers and so on. The users 1414 can interact with the user devices 1406 via user interfaces presented via the user devices 1406. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1406 can have an instance or versioned instance of an application, which can be downloaded from an application store, for example, which can present the user interface(s) described herein. In at least one example, a user 1414 can interact with the user interface via touch input, spoken input, or any other type of input.

As described above, in at least one example, the users 1414 can include merchants 1416 (individually, 1416(A)-1416(N)). In an example, the merchants 1416 can operate respective merchant devices 1408, which can be user devices 1406 configured for use by merchants 1416. For the purpose of this discussion, a "merchant" can be any entity that offers items (e.g., goods or services) for purchase or other means of acquisition (e.g., rent, borrow, barter, etc.). The merchants 1416 can offer items for purchase or other means of acquisition via brick-and-mortar stores, mobile stores (e.g., pop-up shops, food trucks, etc.), online stores, combinations of the foregoing, and so forth. In some examples, at least some of the merchants 1416 can be associated with a same entity but can have different merchant locations and/or can have franchise/franchisee relationships. In additional or alternative examples, the merchants 1416 can be different merchants. That is, in at least one example, the merchant 1416(A) is a different merchant than the merchant 1416(B) and/or the merchant 1416(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN) s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 1408 can have an instance of a POS application 1418 stored thereon. The POS application 1418 can configure the merchant device 1408 as a POS terminal, which enables the merchant 1416(A) to interact with one or more customers 1420. As described above, the users 1414 can include customers, such as the customers 1420 shown as interacting with the merchant 1416(A). For the purpose of this discussion, a "customer" can be any entity that acquires items from merchants. While only two customers 1420 are illustrated in FIG. 14, any number of customers 1420 can interact with the merchants 1416. Further, while FIG. 14 illustrates the customers 1420 interacting with the merchant 1416(A), the customers 1420 can interact with any of the merchants 1416.

In at least one example, interactions between the customers 1420 and the merchants 1416 that involve the exchange of funds (from the customers 1420) for items (from the merchants 1416) can be referred to as "transactions." In at least one example, the POS application 1418 can determine transaction data associated with the POS transactions. Transaction data can include payment information, which can be obtained from a reader device 1422 associated with the merchant device 1408(A), user authentication data, purchase amount information, point-of-purchase information (e.g., item(s) purchased, date of purchase, time of purchase, etc.), etc. The POS application 1418 can send transaction data to the server(s) 1402 such that the server(s) 1402 can track transactions of the customers 1420, merchants 1416, and/or any of the users 1414 over time. Furthermore, the POS application 1418 can present a UI to enable the merchant 1416(A) to interact with the POS application 1418 and/or the service provider via the POS application 1418.

In at least one example, the merchant device 1408(A) can be a special-purpose computing device configured as a POS terminal (via the execution of the POS application 1418). In at least one example, the POS terminal may be connected to a reader device 1422, which is capable of accepting a variety of payment instruments, such as credit cards, debit cards, gift cards, short-range communication based payment instruments, and the like, as described below. In at least one example, the reader device 1422 can plug in to a port in the merchant device 1408(A), such as a microphone port, a headphone port, an audio-jack, a data port, or other suitable port. In additional or alternative examples, the reader device 1422 can be coupled to the merchant device 1408(A) via another wired or wireless connection, such as via a Bluetooth®, BLE, and so on. Additional details are described below with reference to FIG. 16. In some examples, the reader device 1422 can read information from alternative payment instruments including, but not limited to, wristbands and the like.

In some examples, the reader device 1422 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1422, and communicate with the server(s) 1402, which can provide, among other services, a payment processing service. The server(s) 1402 associated with the service provider can communicate with server(s) 1410, as described below. In this manner, the POS terminal and reader device 1422 may collectively process transaction(s) between the merchants 1416 and customers 1420. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1422 of the POS system 1424 are shown as separate devices, in additional or alternative examples, the POS terminal and the reader device 1422 can be part of a single device. In some examples, the reader device 1422 can have a display integrated therein for presenting information to the customers 1420. In additional or alternative examples, the POS terminal can have a display integrated therein for presenting information to the customers 1420. POS systems, such as the POS system 1424, may be mobile, such that POS terminals and reader devices may process transactions in disparate locations across the world. POS systems can be used for processing card-present transactions and card-not-present (CNP) transactions, as described below.

A card-present transaction is a transaction where both a customer 1420 and his or her payment instrument are physically present at the time of the transaction. Card-present transactions may be processed by swipes, dips, taps, or any other interaction between a physical payment instrument (e.g., a card), or otherwise present payment instrument, and a reader device 1422 whereby the reader device 1422 is able to obtain payment data from the payment instrument. A swipe is a card-present transaction where a customer 1420 slides a card, or other payment instrument, having a magnetic strip through a reader device 1422 that captures payment data contained in the magnetic strip. A dip is a card-present transaction where a customer 1420 inserts a payment instrument having an embedded microchip (i.e., chip) into a reader device 1422 first. The dipped payment instrument remains in the payment reader until the reader device 1422 prompts the customer 1420 to remove the card, or other payment instrument. While the payment instrument is in the reader device 1422, the microchip can create a one-time code which is sent from the POS system 1424 to the server(s) 1410 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1420 may tap or hover his or her payment instrument (e.g., card, electronic device such as a smart phone running a payment application, etc.) over a reader device 1422 to complete a transaction via short-range communication (e.g., NFC, RFID, Bluetooth®, BLE, etc.). Short-range communication enables the payment instrument to exchange information with the reader device 1422. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 1424, the server(s) 1402, and/or the server(s) 1410 may exchange payment information and transaction data to determine whether transactions are authorized. For example, the POS system 1424 may provide encrypted payment data, user authentication data, purchase amount information, point-of-purchase information, etc. (collectively, transaction data) to server(s) 1402 over the network(s) 1404. The server(s) 1402 may send the transaction data to the server(s) 1410. As described above, in at least one example, the server(s) 1410 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 1410 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 1410 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 1410 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 1410 associated therewith), and a payment authorization message is communicated from the issuer to the POS device via a path opposite of that described above, or via an alternate path.

As described above, the server(s) 1410, which can be associated with payment service provider(s), may determine whether the transaction is authorized based on the transaction data, as well as information relating to parties to the transaction (e.g., the customer 1420 and/or the merchant 1416(A)). The server(s) 1410 may send an authorization notification over the network(s) 1404 to the server(s) 1402, which may send the authorization notification to the POS system 1424 over the network(s) 1404 to indicate whether the transaction is authorized. The server(s) 1402 may also transmit additional information such as transaction identifiers to the POS system 1424. In one example, the server(s) 1402 may include a merchant application and/or other functional components for communicating with the POS system 1424 and/or the server(s) 1410 to authorize or decline transactions.

Based on the authentication notification that is received by the POS system 1424 from server(s) 1402, the merchant 1416(A) may indicate to the customer 1420 whether the transaction has been approved. In some examples, approval may be indicated at the POS system 1424, for example, at a display of the POS system 1424. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 1414 can access all of the services of the service provider. In other examples, the users 1414 can have gradated access to the services, which can be based on risk tolerance, IDV outputs, subscriptions, and so on. In at least one example, access to such services can be availed to the merchants 1416 via the POS application 1418. In additional or alternative examples, each service can be associated with its own access point (e.g., application, web browser, etc.).

The service provider can offer payment processing services for processing payments on behalf of the merchants 1416, as described above. For example, the service provider can provision payment processing software, payment processing hardware and/or payment processing services to merchants 1416, as described above, to enable the merchants 1416 to receive payments from the customers 1420 when conducting POS transactions with the customers 1420. For instance, the service provider can enable the merchants 1416 to receive cash payments, payment card payments, and/or electronic payments from customers 1420 for POS transactions and the service provider can process transactions on behalf of the merchants 1416.

As the service provider processes transactions on behalf of the merchants 1416, the service provider can maintain accounts or balances for the merchants 1416 in one or more ledgers. For example, the service provider can analyze transaction data received for a transaction to determine an amount of funds owed to a merchant 1416(A) for the transaction. In at least one example, such an amount can be a total purchase price less fees charged by the service provider for providing the payment processing services. Based on determining the amount of funds owed to the merchant 1416(A), the service provider can deposit funds into an account of the merchant 1416(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 1416(A) to a bank account of the merchant 1416(A) that is held at a bank or other financial institution (e.g., associated with the server(s) 1410). Scheduled deposits can occur at a prearranged time after a POS transaction is funded, which can be a business day after the POS transaction occurred, or sooner or later. In some examples, the merchant 1416(A) can access funds prior to a scheduled deposit. For instance, the merchant 1416(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 1416(A) can have a payment instrument that is linked to the stored balance that enables the merchant to access the funds without first transferring the funds from the account managed by the service provider to the bank account of the merchant 1416(A).

In at least one example, the service provider may provide inventory management services. That is, the service provider may provide inventory tracking and reporting. Inventory management services may enable the merchant 1416(A) to access and manage a database storing data associated with a quantity of each item that the merchant 1416(A) has available (i.e., an inventory). Furthermore, in at least one example, the service provider can provide catalog management services to enable the merchant 1416(A) to maintain a catalog, which can be a database storing data associated with items that the merchant 1416(A) has available for acquisition (i.e., catalog management services). In at least one example, the catalog may include a plurality of data items and a data item of the plurality of data items may represent an item that the merchant 1416(A) has available for acquisition. The service provider can offer recommendations related to pricing of the items, placement of items on the catalog, and multi-party fulfillment of the inventory.

In at least one example, the service provider can provide business banking services, which allow the merchant 1416(A) to track deposits (from payment processing and/or other sources of funds) into an account of the merchant 1416(A), payroll payments from the account (e.g., payments to employees of the merchant 1416(A)), payments to other merchants (e.g., business-to-business) directly from the account or from a linked debit card, withdrawals made via scheduled deposit and/or instant deposit, etc. Furthermore, the business banking services can enable the merchant 1416(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1416 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1416. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider 1412 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 1414 who are unfamiliar with HTML, XML, JavaScript®, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1416. In at least one example, the service provider can recommend and/or generate content items to supplement omni-channel presences of the merchants 1416. That is, if a merchant of the merchants 1416 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 1414 to set schedules for scheduling appointments and/or users 1414 to schedule appointments.

In some examples, the service provider can provide restaurant management services to enable users 1414 to make and/or manage reservations, to monitor front-of-house and/or back-of-house operations, and so on. In such examples, the merchant device(s) 1408 and/or server(s) 1402 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 1414 who can travel between locations to perform services for a requesting user 1414 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 1406.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 1414, voice inputs into a virtual assistant or the like, to determine intents of user(s) 1414. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1414 may be new to the service provider such that the user 1414 that has not registered (e.g., subscribed to receive access to one or more services offered by the service provider) with the service provider. The service provider can offer onboarding services for registering a potential user 1414 with the service provider. In some examples, onboarding can involve presenting various questions, prompts, and the like to a potential user 1414 to obtain information that can be used to generate a profile for the potential user 1414. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 1414 providing all necessary information, the potential user 1414 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 1410). That is, the service provider can offer IDV services to verify the identity of users 1414 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 1414 accurately identifies the customer (or potential customer), i.e., "Is the customer who they say they are?"

The service provider is capable of providing additional or alternative services and the services described above are offered as a sampling of services. In at least one example, the service provider can exchange data with the server(s) 1410 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 1402) and/or the server(s) 1410 via the network(s) 1404. In some examples, the merchant device(s) 1408 are not capable of connecting with the service provider (e.g., the server(s) 1402) and/or the server(s) 1410, due to a network connectivity issue, for example. In additional or alternative examples, the server(s) 1402 are not capable of communicating with the server(s) 1410 due to network connectivity issue, for example. In such examples, devices may operate in "offline" mode where at least some payment data is stored (e.g., on the merchant device(s) 1408) and/or the server(s) 1402 until connectivity is restored and the payment data can be transmitted to the server(s) 1402 and/or the server(s) 1410 for processing.

In at least one example, the service provider can be associated with a hub, such as an order hub, an inventory hub, a fulfillment hub and so on, which can enable integration with one or more additional service providers (e.g., associated with the additional server(s) 1410). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 1406 that are in communication with server(s) 1402 of the service provider. That is, techniques described herein are directed to a specific implementation—or, a practical application—of utilizing a distributed system of user devices 1406 that are in communication with server(s) 1402 of the service provider to perform a variety of services, as described above. The unconventional configuration of the distributed system described herein enables the server(s) 1402 that are remotely-located from end-users (e.g., users 1414) to intelligently offer services based on aggregated data associated with the end-users, such as the users 1414 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1414 and user devices 1406. Furthermore, such features are changed dynamically based on the profiles of the users involved interacting with the GUIs. As such, techniques described herein are directed to improvements to computing systems.

Figure 15:
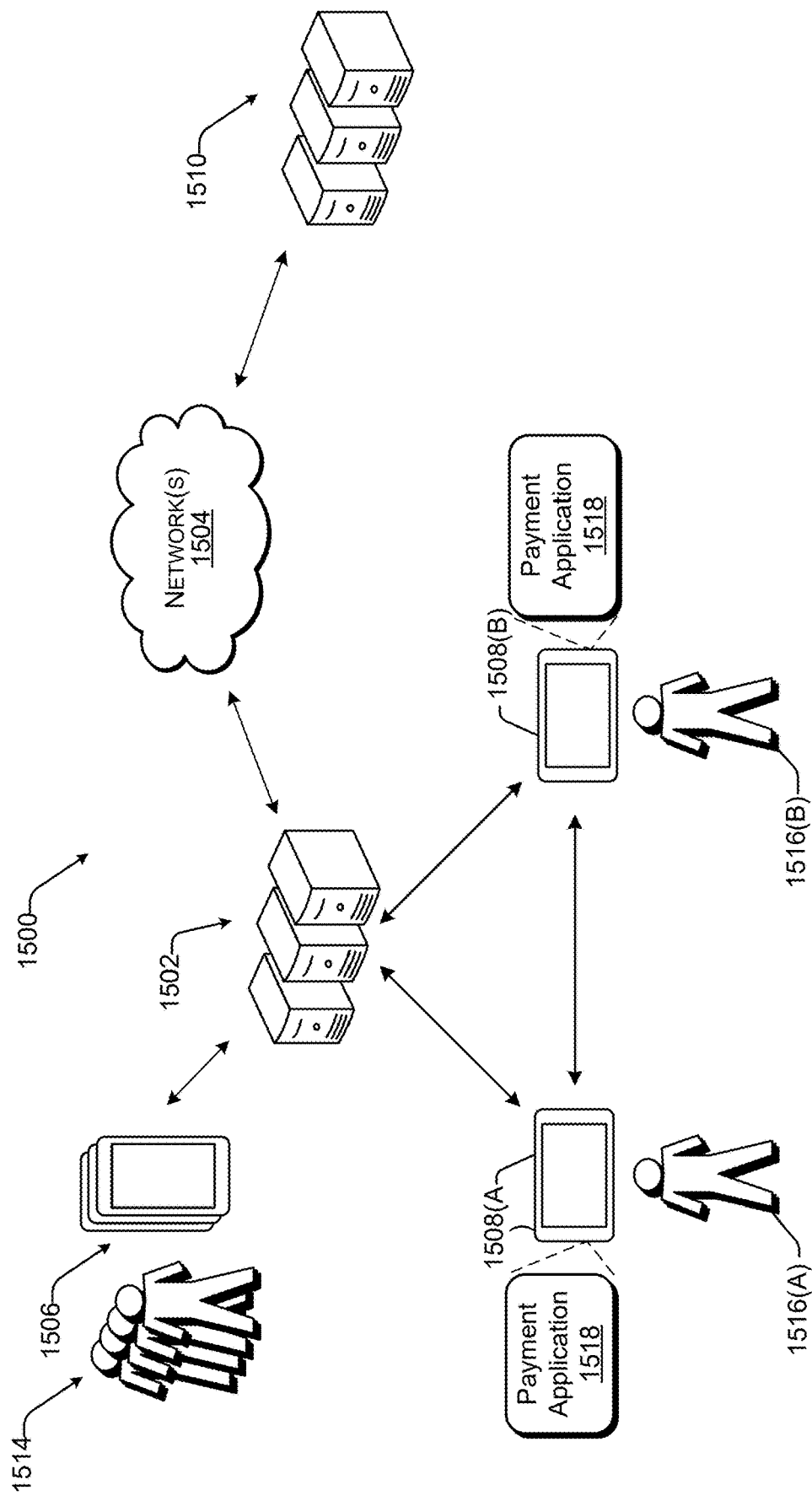
FIG. 15 is an example environment with which techniques described herein can be implemented, according to an embodiment described herein.

FIG. 15 illustrates an example environment 1500. The environment 1500 includes server(s) 1502 that can communicate over a network 1504 with user devices 1506 (which, in some examples can be user devices 1508 (individually, 1508(A), 1508(B)) and/or server(s) 1510 associated with third-party service provider(s). The server(s) 1502 can be associated with a service provider that can provide one or more services for the benefit of users 1514, as described below. Actions attributed to the service provider can be performed by the server(s) 1502. In some examples, the service provider 1412 referenced in FIG. 14 can be the same or different than the service provider referenced in FIG. 15 as well as service provider system 102.

The environment 1500 can include a plurality of user devices 1506, as described above for client device 104. Each one of the plurality of user devices 1506 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1514. The users 1514 can be referred to as customers, buyers, merchants, sellers, borrowers, employees, employers, payors, payees, couriers and so on. The users 1514 can interact with the user devices 1506 via user interfaces presented via the user devices 1506. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1506 can have an instance or versioned instance of an application, which can be downloaded from an application store, for example, which can present the user interface(s) described herein. In at least one example, a user 1514 can interact with the user interface via touch input, spoken input, or any other type of input.

In at least one example, the service provider can provide a peer-to-peer payment service that enables peer-to-peer payments between two or more users 1514. Two users, user 1516(A) and user 1516(B) are illustrated in FIG. 15 as "peers" in a peer-to-peer payment. In at least one example, the service provider can communicate with instances of a payment application 1518 (or other access point) installed on devices 1506 configured for operation by users 1514. In an example, an instance of the payment application 1518 executing on a first device 1508(A) operated by a payor (e.g., user 1516(A)) can send a request to the service provider to transfer an asset (e.g., fiat currency, non-fiat currency, digital assets, cryptocurrency, securities, gift cards, and/or related assets) from the payor to a payee (e.g., user 1516(B)) via a peer-to-peer payment. In some examples, assets associated with an account of the payor are transferred to an account of the payee. In some examples, assets can be held at least temporarily in an account of the service provider prior to transferring the assets to the account of the payee.

Figure 16:
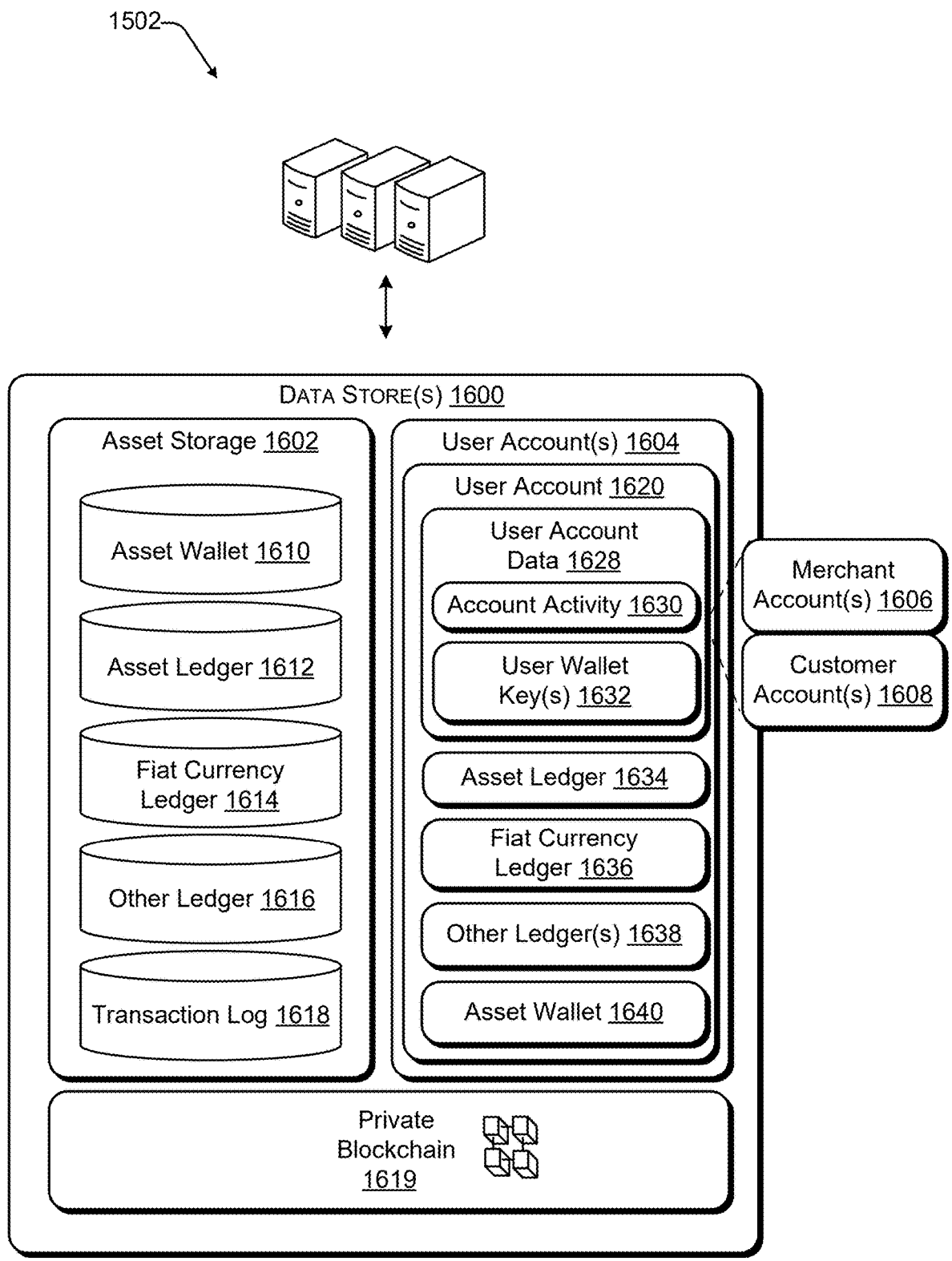
FIG. 16 is an environment associated with a ledger system with which techniques described herein can be implemented, according to an embodiment described herein.

In some examples, the service provider can utilize a ledger system to track transfers of assets between users 1514. FIG. 16, below, provides additional details associated with such a ledger system. The ledger system can enable users 1514 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 1518 executing on user device(s) of payee(s). As an example, the service provider can transfer assets from an account of user 1516(A) to an account of the user 1516(B) and can send a notification to the user device 1508(B) of the user 1516(B) for presentation via a user interface. The notification can indicate that a transfer is in process, a transfer is complete, or the like. In some examples, the service provider can send additional or alternative information to the instances of the payment application 1518 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 1502 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 1518 executing on the user devices 1506. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, the content provider can be the service provider as described with reference to FIG. 15 or a third-party service provider associated with the server(s) 1510. In examples where the content provider is a third-party service provider, the server(s) 1510 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 15. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1506 (e.g., mobile device or conventional personal computer (PC)) based on instructions transmitted to and from the server(s) 1502 (which, in such an example can be called a "messaging server"). In some instances, the messaging application can include a payment application with messaging capability that enables users of the payment application to communicate with one another. In such instances, the payment application can be executed on a user device 1506 based on instructions transmitted to and from the server(s) 1502 (e.g., the payment service discussed in this description or another payment service that supports payment transactions). In some examples, the messaging application can be provided by a third-party service provider associated with the server(s) 1510. In examples where the messaging application is a third-party service provider, the server(s) 1510 can be accessible via one or more APIs or other integrations.

As described above, the service provider can facilitate peer-to-peer transactions, which can enable users 1514 to transfer fiat currency, non-fiat currency, cryptocurrency, securities, or other assets, or portions thereof, to other users 1514. In at least one example, individual users can be associated with user accounts. Additional details associated with user accounts and the transfer of assets between users 1514 are described below with reference to FIG. 16.

Furthermore, the service provider of FIG. 15 can enable users 1514 to perform banking transactions via instances of the payment application 1518. For example, users can configure direct deposits or other deposits for adding assets to their various ledgers/balances. Further, users 1514 can configure bill pay, recurring payments, and/or the like using assets associated with their accounts. In addition to sending and/or receiving assets via peer-to-peer transactions, users 1514 buy and/or sell assets via asset networks such as cryptocurrency networks, securities networks, and/or the like.

FIG. 16 illustrates example data store(s) 1600 that can be associated with the server(s) 1502. In at least one example, the data store(s) 1600 can store assets in an asset storage 1602, as well as data in user account(s) 1604. In some examples, user account(s) 1604 can include merchant account(s) 1606, and/or customer account(s) 1608. In at least one example, the asset storage 1602 can be used to store assets managed by the service provider of FIG. 15. In at least one example, the asset storage 1602 can be used to record whether individual of the assets are registered to users. For example, the asset storage 1602 can include an asset wallet 1610 for storing records of assets owned by the service provider of FIG. 15, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 1510 can be associated therewith. In some examples, the asset wallet 1610 can communicate with the asset network via one or more components associated with the server(s) 1502.

The asset wallet 1610 can be associated with one or more addresses and can vary addresses used to acquire assets (e.g., from the asset network(s)) so that its holdings are represented under a variety of addresses on the asset network. In examples where the service provider of FIG. 15 has its own holdings of cryptocurrency (e.g., in the asset wallet 1610), a user can acquire cryptocurrency directly from the service provider of FIG. 15. In some examples, the service provider of FIG. 15 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 1602 may contain ledgers that store records of assignments of assets to users 1514. Specifically, the asset storage 1602 may include asset ledger 1610, fiat currency ledger 1614, and other ledger(s) 1616, which can be used to record transfers of assets between users 1514 of the service provider and/or one or more third-parties (e.g., merchant network(s), payment card network(s), ACH network(s), equities network(s), the asset network, securities networks, etc.). In doing so, the asset storage 1602 can maintain a running balance of assets managed by the service provider of FIG. 15. The ledger(s) of the asset storage 1602 can further indicate some of the running balance for each of the ledger(s) stored in the asset storage 1602 is assigned or registered to one or more user account(s) 1604.

In at least one example, the asset storage 1602 can include transaction logs 1618, which can include records of past transactions involving the service provider of FIG. 15. In at least one example, transaction data, as described herein, can be stored in association with the transaction logs 1618.

In some examples, the data store(s) 1600 can store a private blockchain 1619. A private blockchain 1619 can function to record sender addresses, recipient addresses, public keys, values of cryptocurrency transferred, and/or can be used to verify ownership of cryptocurrency tokens to be transferred. In some examples, the service provider of FIG. 15 can record transactions taking place within the service provider of FIG. 15 involving cryptocurrency until the number of transactions has exceeded a determined limit (e.g., number of transactions, storage space allocation, etc.). Based at least in part on determining that the limit has been reached, the service provider of FIG. 15 can publish the transactions in the private blockchain 1619 to a public blockchain (e.g., associated with the asset network), where miners can verify the transactions and record the transactions to blocks on the public blockchain. In at least one example, the service provider of FIG. 15 can participate as miner(s) at least for its transactions to be posted to the public blockchain.

In at least one example, the data store(s) 1600 can store and/or manage accounts, such as user account(s) 1604, merchant account(s) 1606, and/or customer account(s) 1608. In at least one example, the user account(s) 1604 may store records of user accounts associated with the users 1514. In at least one example, the user account(s) 1604 can include a user account 1620, which can be associated with a user (of the users 1514). Other user accounts of the user account(s) 1604 can be similarly structured to the user account 1620, according to some examples. In other examples, other user accounts may include more or less data and/or account information than that provided by the user account 1620. In at least one example, the user account 1620 can include user account data 1628, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1628 can include account activity 1630 and user wallet key(s) 1632. The account activity 1630 may include a transaction log for recording transactions associated with the user account 1620. In some examples, the user wallet key(s) 1632 can include a public-private key-pair and a respective address associated with the asset network or other asset networks. In some examples, the user wallet key(s) 1632 may include one or more key pairs, which can be unique to the asset network or other asset networks.

In addition to the user account data 1628, the user account 1620 can include ledger(s) for account(s) managed by the service provider of FIG. 15, for the user. For example, the user account 1620 may include an asset ledger 1634, a fiat currency ledger 1636, and/or one or more other ledgers 1638. The ledger(s) can indicate that a corresponding user utilizes the service provider of FIG. 15 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 15.

In some examples, the asset ledger 1614 can store a balance for each of one or more cryptocurrencies (e.g., Bitcoin, Ethereum, Litecoin, etc.) registered to the user account 1620. In at least one example, the asset ledger 1614 can further record transactions of cryptocurrency assets associated with the user account 1620. For example, the user account 1620 can receive cryptocurrency from the asset network using the user wallet key(s) 1612. In some examples, the user wallet key(s) 1612 may be generated for the user upon request. User wallet key(s) 1612 can be requested by the user in order to send, exchange, or otherwise control the balance of cryptocurrency held by the service provider of FIG. 15 (e.g., in the asset wallet 1610) and registered to the user. In some examples, the user wallet key(s) 1612 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 15 and the value is credited as a balance in asset ledger 1614), by purchasing currency in the form associated with the account using currency in a different form (e.g., buying a value of cryptocurrency from the service provider of FIG. 15 using a value of fiat currency reflected in fiat currency ledger 1616, and crediting the value of cryptocurrency in asset ledger 1614), or by conducting a transaction with another user (customer or merchant) of the service provider of FIG. 15 wherein the account receives incoming currency (which can be in the form associated with the account or a different form, in which the incoming currency may be converted to the form associated with the account). In some examples, the user account data 1628 can include preferences for maintaining balances of individual of the ledgers. For example, the service provider of FIG. 15 can automatically debit the fiat currency ledger 1616 to increase the asset ledger 1614, or another account associated with the user whenever the cryptocurrency balance (e.g., of the asset ledger 1614) falls below a stated level (e.g., a threshold). Conversely, in some embodiments, the service provider of FIG. 15 can automatically credit the fiat currency ledger 1616 to decrease the asset ledger 1614 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party unrelated to the service provider of FIG. 15 (i.e., an external account). In at least one example, the user can transfer all or a portion of a balance of the cryptocurrency stored in the third-party cryptocurrency wallet to the service provider of FIG. 15. Such a transaction can require the user to transfer an amount of the cryptocurrency in a message signed by user's private key to an address provided by the service provider of FIG. 15. In at least one example, the transaction can be sent to miners to bundle the transaction into a block of transactions and to verify the authenticity of the transactions in the block. Once a miner has verified the block, the block is written to a public, distributed blockchain where the service provider of FIG. 15 can then verify that the transaction has been confirmed and can credit the user's asset ledger 1614 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 15. As described above, in some examples, the service provider of FIG. 15 can acquire cryptocurrency from a third-party source. In such examples, the asset wallet 1610 can be associated with different addresses and can vary addresses used to acquire cryptocurrency so that its holdings are represented under a variety of addresses on a blockchain. When the service provider of FIG. 15 has their own holdings of cryptocurrency, users can acquire cryptocurrency directly from the service provider of FIG. 15. In some examples, the service provider of FIG. 15 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 15 has its own cryptocurrency assets, cryptocurrency transferred in a transaction (e.g., data with address provided for receipt of transaction and a balance of cryptocurrency transferred in the transaction) can be stored in the asset wallet 1610. In at least one example, the service provider of FIG. 15 can credit the asset ledger 1614 of the user. Additionally, while the service provider of FIG. 15 recognizes that the user retains the value of the transferred cryptocurrency through crediting the asset ledger 1614, any person that inspects the blockchain will see the cryptocurrency as having been transferred to the service provider of FIG. 15. In some examples, the asset wallet 1610 can be associated with many different addresses. In such examples, any person that inspects the blockchain may not easily associate all cryptocurrency stored in asset wallet 1610 as belonging to the same entity. It is this presence of a private ledger that is used for real-time transactions and maintained by the service provider of FIG. 15, combined with updates to the public ledger at other times, that allows for extremely fast transactions using cryptocurrency to be achieved. In some examples, the "private ledger" can refer to the asset ledger 1610, which in some examples, can utilize the private blockchain 1619, as described herein. The "public ledger" can correspond to a public blockchain associated with the asset network.

In at least one example, a user's asset ledger 1614, fiat currency ledger 1616, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1614. In some examples, a user can receive fiat currency or another currency in the form of payment for a transaction with another user. In at least one example, at least a portion of such funds can be converted into cryptocurrency by the service provider of FIG. 15 and used to fund the asset ledger 1614 of the user.

As addressed above, in some examples, users can also have other accounts maintained by the service provider of FIG. 15. For example, a user can also have an account in U.S. dollars, which can be tracked, for example, via the fiat currency ledger 1616. Such an account can be funded by transferring money from a bank account at a third-party bank to an account maintained by the service provider of FIG. 15 as is conventionally known. In some examples, a user can receive fiat currency in the form of payment for a transaction with another user. In such examples, at least a portion of such funds can be used to fund the fiat currency ledger 1616.

In some examples, a user can have one or more internal payment cards registered with the service provider of FIG. 15. Internal payment cards can be linked to one or more of the accounts associated with the user account 1620. In some embodiments, options with respect to internal payment cards can be adjusted and managed using an application (e.g., the payment application 1518).

In at least one example, as described above, each ledger can correspond to an account of the user that is managed by the service provider of FIG. 15. In at least one example, individual of the accounts can be associated with a wallet or a stored balance for use in payment transactions, peer-to-peer transactions, payroll payments, etc.

In at least one example, the user account 1620 can be associated with an asset wallet 1640. The asset wallet 1640 of the user can be associated with account information that can be stored in the user account data 1628 and, in some examples, can be associated with the user wallet key(s) 1612. In at least one example, the asset wallet 1640 can store data indicating an address provided for receipt of a cryptocurrency transaction. In at least one example, the balance of the asset wallet 1640 can be based at least in part on a balance of the asset ledger 1614. In at least one example, funds availed via the asset wallet 1640 can be stored in the asset wallet 1640 or the asset wallet 1610. Funds availed via the asset wallet 1610 can be tracked via the asset ledger 1614. The asset wallet 1640, however, can be associated with additional cryptocurrency funds.

In at least one example, when the service provider of FIG. 15 includes a private blockchain 1619 for recording and validating cryptocurrency transactions, the asset wallet 1640 can be used instead of, or in addition to, the asset ledger 1614. For example, at least one example, a merchant can provide the address of the asset wallet 1640 for receiving payments. In an example where a customer is paying in cryptocurrency and the customer has their own cryptocurrency wallet account associated with the service provider of FIG. 15, the customer can send a message signed by its private key including its wallet address (i.e., of the customer) and identifying the cryptocurrency and value to be transferred to the merchant's asset wallet 1640. The service provider of FIG. 15 can complete the transaction by reducing the cryptocurrency balance in the customer's cryptocurrency wallet and increasing the cryptocurrency balance in the merchant's asset wallet 1640. In addition to recording the transaction in the respective cryptocurrency wallets, the transaction can be recorded in the private blockchain 1619 and the transaction can be confirmed. A user can perform a similar transaction with cryptocurrency in a peer-to-peer transaction as described above. In at least one example, the cryptocurrency wallet account 1610 can be funded by a balance transfer from a third-party cryptocurrency wallet, as described above. Such a transaction can involve transfer by a user of an amount of cryptocurrency in a message signed by the user's private key to an address of the cryptocurrency wallet account 1610. The transferred amount of cryptocurrency can then be within the cryptocurrency wallet account 1610 for use in later transactions.

While the asset ledger 1614 and/or asset wallet 1640 are each described above with reference to cryptocurrency, the asset ledger 1614 and/or asset wallet 1640 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider of FIG. 15 is an aspect of the technology disclosed that enables technical advantages of increased processing speed and improved security.

Figure 17:
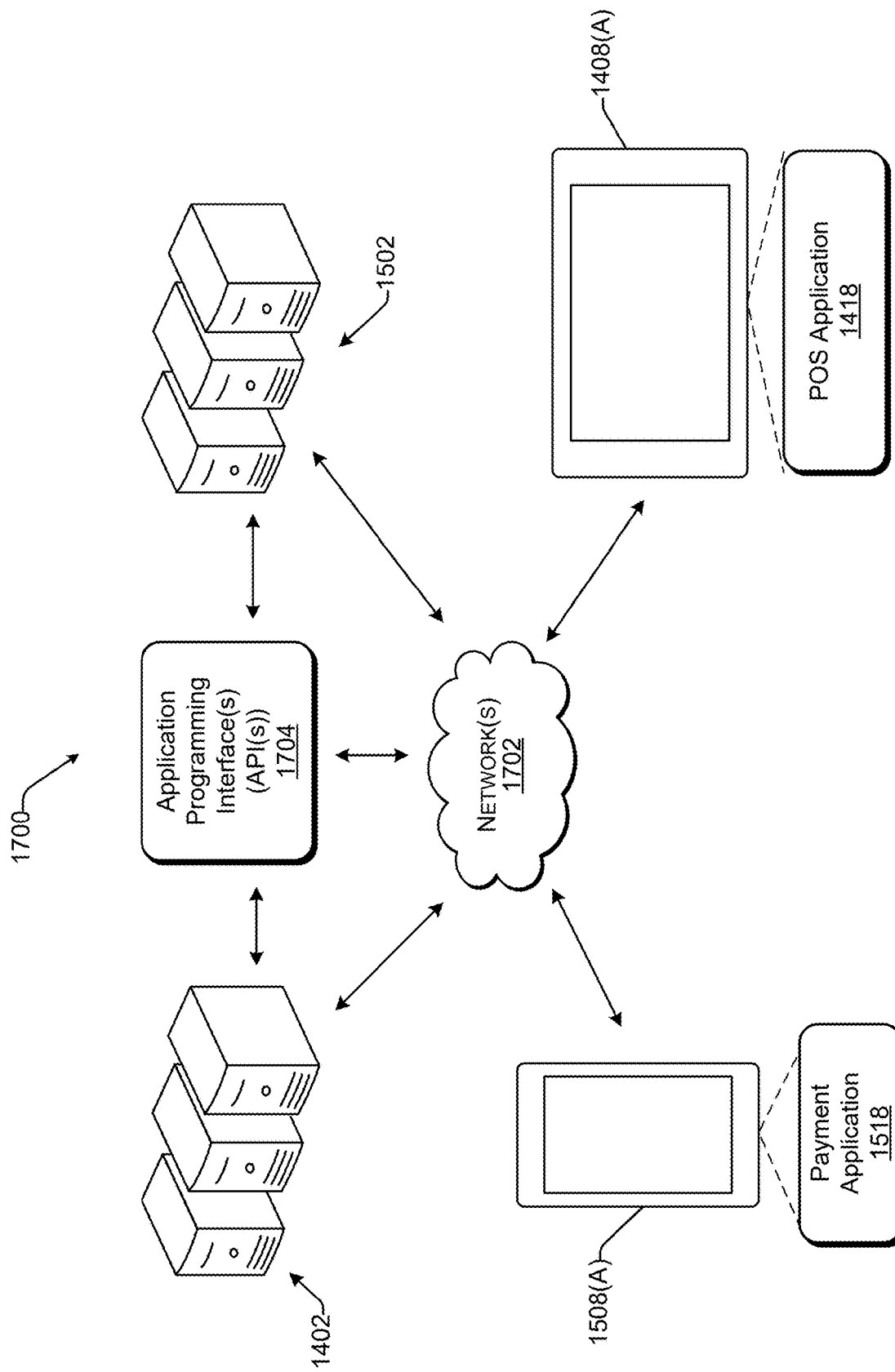
FIG. 17 is an example environment in which the environments of FIGS. 14 and 15 can be integrated to enable payments at the point-of-sale using assets associated with user accounts in the peer-to-peer environment of FIG. 16 with which techniques described herein can be implemented, according to an embodiment described herein.

FIG. 17 illustrates an example environment 1700 wherein the environment 1400 and the environment 1500 can be integrated to enable payments at the point-of-sale using assets associated with user accounts in the peer-to-peer environment of FIG. 15. As illustrated, each of the components can communicate with one another via one or more networks 1702. In some examples, one or more APIs 1704 or other functional components can be used to facilitate such communication.

In at least one example, the example environment 1700 can enable contactless payments, via integration of peer-to-peer payment, or other payment making, platform(s) and payment processing platform(s), are described herein. For the purpose of FIG. 16, the environment 1400 can refer to a payment processing platform and the environment 1500 can refer to a peer-to-peer payment, or payment making, platform. In an example, such an integration can enable a customer to participate in a transaction via their own computing device instead of interacting with a merchant device of a merchant, such as the merchant device 1408(A). In such an example, the POS application 1418, associated with a payment processing platform and executable by the merchant device 1408(A) of the merchant, can present a Quick Response (QR) code, or other code that can be used to identify a transaction (e.g., a transaction code), in association with a transaction between the customer and the merchant. The QR code, or other transaction code, can be provided to the POS application 1418 via an API associated with the peer-to-peer payment platform. In an example, the customer can utilize their own computing device, such as the user device 1508(A), to capture the QR code, or the other transaction code, and to provide an indication of the captured QR code, or other transaction code, to server(s) 1402 and/or server(s) 1502.

Based at least in part on the integration of the peer-to-peer payment platform and the payment processing platform (e.g., via the API), the server(s) 1402 and/or 1502 associated with each can exchange communications with each other—and with a payment application 1518 associated with the peer-to-peer payment platform and/or the POS application 1418—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 1508(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1508(A), can be specially configured as a buyer-facing device that can enable the customer to view a cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1418 and the payment application 1518, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 1508(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 1418, associated with a payment processing platform, on the merchant device 1408(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 1408(A) can present a QR code, or other transaction code, that can be associated with a peer-to-peer payment platform. The customer can use a camera associated with the user device 1508(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 1418, associated with a payment processing platform, on the merchant device 1408(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 1418 can cause a text message with a resource locator (e.g., uniform resource locator (URL)) that can be associated with a peer-to-peer payment platform to be sent to the user device 1508(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction—between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 1508(A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 1418 of a merchant device 1408(A) at a brick-and-mortar store of a merchant to a payment application 1518 of a user device 1508(A) of a customer to enable the customer to participate in a transaction via their own computing device. For instance, in a "scan to pay" example as described above, based at least in part on capturing the QR code, or other transaction code, via the user device 1508(A), the payment processing platform can provide transaction data to the peer-to-peer payment platform for presentation via the payment application 1518 on the user device 1508(A). In some examples, the customer can watch items being added to their cart (e.g., via a user interface presented via the payment application). As an item is added to a virtual cart by the merchant—via the POS application 1418 on the merchant device 1408(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 1518 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 1508(A) during or after payment of the transaction.

In some examples, based at least in part on capturing the QR code, or other transaction code, the payment processing platform can provide transaction data to the peer-to-peer payment platform for presentation via the payment application 1518 on the computing device of the customer, such as the user device 1508(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 1518 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 1418, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1518 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

FIG. 18 depicts an illustrative block diagram illustrating a system 1800 for performing techniques described herein. The system 1800 includes a user device 1802, that communicates with server computing device(s) (e.g., server(s) 1804) via network(s) 1806 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1802 is illustrated, in additional or alternate examples, the system 1800 can have multiple user devices as client devices 104.

In at least one example, the user device 1802 (and client device 104) can be any suitable type of computing device, e.g., portable, semi-portable, semi-stationary, or stationary. Some examples of the user device 1802 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1802 can be any computing device capable of sending communications and performing the functions according to the techniques described herein. The user device 1802 can include devices, e.g., payment card readers, or components capable of accepting payments, as described below.

In the illustrated example, the user device 1802 includes one or more processors 1808, one or more computer-readable media 1810, one or more communication interface(s) 1812, one or more input/output (I/O) devices 1814, a display 1816, and sensor(s) 1818.

In at least one example, each processor 1808 can itself comprise one or more processors or processing cores. For example, the processor(s) 1808 can be implemented as one or more microprocessors, microcomputers, microcontrollers, digital signal processors, central processing units, state machines, logic circuitries, and/or any devices that manipulate signals based on operational instructions. In some examples, the processor(s) 1808 can be one or more hardware processors and/or logic circuits of any suitable type specifically programmed or configured to execute the algorithms and processes described herein. The processor(s) 1808 can be configured to fetch and execute computer-readable processor-executable instructions stored in the computer-readable media 1810.

Depending on the configuration of the user device 1802, the computer-readable media 1810 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1810 can include, but is not limited to, RAM, ROM, EEPROM, flash memory, solid-state storage, magnetic disk storage, optical storage, and/or other computer-readable media technology. Further, in some examples, the user device 1802 can access external storage, such as RAID storage systems, storage arrays, network attached storage, storage area networks, cloud storage, or any other medium that can be used to store information and that can be accessed by the processor(s) 1808 directly or through another computing device or network. Accordingly, the computer-readable media 1810 can be computer storage media able to store instructions, components or components that can be executed by the processor(s) 1808. Further, when mentioned, non-transitory computer-readable media exclude media such as energy, carrier signals, electromagnetic waves, and signals per se.

The computer-readable media 1810 can be used to store and maintain any number of functional components that are executable by the processor(s) 1808. In some implementations, these functional components comprise instructions or programs that are executable by the processor(s) 1808 and that, when executed, implement operational logic for performing the actions and services attributed above to the user device 1802. Functional components stored in the computer-readable media 1810 can include a user interface 1820 to enable users to interact with the user device 1802, and thus the server(s) 1804 and/or other networked devices. In at least one example, the user interface 1820 can be presented via a web browser, or the like. In other examples, the user interface 1820 can be presented via an application, such as a mobile application or desktop application, which can be provided by a service provider associated with the server(s) 1804, or which can be an otherwise dedicated application. In some examples, the user interface 1820 can be user interfaces as shown in FIGS. 3, 9, 11, and 12. In at least one example, a user can interact with the user interface via touch input, spoken input, gesture, or any other type of input. The word "input" is also used to describe "contextual" input that may not be directly provided by the user via the user interface 1820. For example, user's interactions with the user interface 1820 are analyzed using, e.g., natural language processing techniques, to determine context or intent of the user, which may be treated in a manner similar to "direct" user input.

Depending on the type of the user device 1802, the computer-readable media 1810 can also optionally include other functional components and data, such as other components and data 1822, which can include programs, drivers, etc., and the data used or generated by the functional components. In addition, the computer-readable media 1810 can also store data, data structures and the like, that are used by the functional components. Further, the user device 1802 can include many other logical, programmatic and physical components, of which those described are merely examples that are related to the discussion herein.

In at least one example, the computer-readable media 1810 can include additional functional components, such as an operating system 1824 for controlling and managing various functions of the user device 1802 and for enabling basic user interactions.

The communication interface(s) 1812 can include one or more interfaces and hardware components for enabling communication with various other devices, such as over the network(s) 1806 or directly. For example, communication interface(s) 1812 can enable communication through one or more network(s) 1806, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1806 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1802 can further include one or more input/output (I/O) devices 1814. The I/O devices 1814 can include speakers, a microphone, a camera, and various user controls (e.g., buttons, a joystick, a keyboard, a keypad, etc.), a haptic output device, and so forth. The I/O devices 1814 can also include attachments that leverage the accessories (audio-jack, USB-C, Bluetooth, etc.) to connect with the user device 1802.

In at least one example, user device 1802 can include a display 1816. Depending on the type of computing device(s) used as the user device 1802, the display 1816 can employ any suitable display technology. For example, the display 1816 can be a liquid crystal display, a plasma display, a light emitting diode display, an OLED (organic light-emitting diode) display, an electronic paper display, or any other suitable type of display able to present digital content thereon. In at least one example, the display 1816 can be an augmented reality display, a virtual reality display, or any other display able to present and/or project digital content. In some examples, the display 1816 can have a touch sensor associated with the display 1816 to provide a touchscreen display configured to receive touch inputs for enabling interaction with a graphic interface presented on the display 1816. Accordingly, implementations herein are not limited to any particular display technology. Alternatively, in some examples, the user device 1802 may not include the display 1816, and information can be presented by other means, such as aurally, haptically, etc.

In addition, the user device 1802 can include sensor(s) 1818. The sensor(s) 1818 can include a GPS device able to indicate location information. Further, the sensor(s) 1818 can include, but are not limited to, an accelerometer, gyroscope, compass, proximity sensor, camera, microphone, and/or a switch.

In some example, the GPS device can be used to identify a location of a user. In at least one example, the location of the user can be used by the service provider, described above, to provide one or more services. That is, in some examples, the service provider can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users and/or for sending users notifications regarding available appointments with merchant(s) located proximate to the users. In at least one example, location can be used for taking payments from nearby customers when they leave a geofence, or location can be used to initiate an action responsive to users enter a brick-and-mortar store of a merchant. Location can be used in additional or alternative ways as well.

Additionally, the user device 1802 can include various other components that are not shown, examples of which include removable storage, a power source, such as a battery and power control unit, a barcode scanner, a printer, a cash drawer, and so forth.

In addition, in some examples, the user device 1802 can include, be connectable to, or otherwise be coupled to a reader device 1826, for reading payment instruments and/or identifiers associated with payment objects. In some examples, as described above, the reader device 1826 can plug in to a port in the user device 1802, such as a microphone port, a headphone port, an audio-jack, a data port, or other suitable port. In additional or alternative examples, the reader device 1826 can be coupled to the user device 1802 via another wired or wireless connection, such as via a Bluetooth®, BLE, and so on. The reader device 1826 can include a read head for reading a magnetic strip of a payment card, and further can include encryption technology for encrypting the information read from the magnetic strip. Additionally or alternatively, the reader device 1826 can be an EMV payment reader, which in some examples, can be embedded in the user device 1802. Moreover, numerous other types of readers can be employed with the user device 1802 herein, depending on the type and configuration of the user device 1802.

The reader device 1826 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1826 may include hardware implementation, such as slots, magnetic tracks, and rails with one or more sensors or electrical contacts to facilitate detection and acceptance of a payment instrument. That is, the reader device 1826 may include hardware implementations to enable the reader device 1826 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1826 may also include a biometric sensor to receive and process biometric characteristics and process them as payment instruments, given that such biometric characteristics are registered with the payment service and connected to a financial account with a bank server.

The reader device 1826 may include processing unit(s), computer-readable media, a reader chip, a transaction chip, a timer, a clock, a network interface, a power supply, and so on. The processing unit(s) of the reader device 1826 may execute one or more components and/or processes to cause the reader device 1826 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1826, the computer-readable media may include volatile memory (such as RAM), non-volatile memory (such as ROM, flash memory, miniature hard drive, memory card, or the like), or some combination thereof. In at least one example, the computer-readable media of the reader device 1826 may include at least one component for performing various functions as described herein.

The reader chip may perform functionalities to control the operations and processing of the reader device 1826. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 1806, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1826. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 1802, which can be a POS terminal, and the reader device 1826 are shown as separate devices, in additional or alternative examples, the user device 1802 and the reader device 1826 can be part of a single device, which may be a battery-operated device. In such an example, components of both the user device 1802 and the reader device 1826 may be associated with the single device. In some examples, the reader device 1826 can have a display integrated therewith, which can be in addition to (or as an alternative of) the display 1816 associated with the user device 1802.

The server(s) 1804 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1804 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1804 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1804 can include one or more processors 1828, one or more computer-readable media 1830, one or more I/O devices 1832, and one or more communication interfaces 1834. Each processor 1828 can be a single processing unit or a number of processing units, and can include single or multiple computing units or multiple processing cores. The processor(s) 1828 can be implemented as one or more microprocessors, microcomputers, microcontrollers, digital signal processors, central processing units, state machines, logic circuitries, and/or any devices that manipulate signals based on operational instructions. For example, the processor(s) 1828 can be one or more hardware processors and/or logic circuits of any suitable type specifically programmed or configured to execute the algorithms and processes described herein. The processor(s) 1828 can be configured to fetch and execute computer-readable instructions stored in the computer-readable media 1830, which can program the processor(s) 1828 to perform the functions described herein.

The computer-readable media 1830 can include volatile and nonvolatile memory and/or removable and non-removable media implemented in any type of technology for storage of information, such as computer-readable instructions, data structures, program components, or other data. Such computer-readable media 1830 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1804, the computer-readable media 1830 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1830 can be used to store any number of functional components that are executable by the processor(s) 1828. In many implementations, these functional components comprise instructions or programs that are executable by the processors 1828 and that, when executed, specifically configure the one or more processors 1828 to perform the actions attributed above to the service provider and/or payment processing service. Functional components stored in the computer-readable media 1830 can optionally include the digital content consumption module 114, digital services 110, search engine 120, communication module 112, and so forth.

The merchant component 1836 can be configured to receive transaction data from POS systems. The merchant component 1836 can transmit requests (e.g., authorization, capture, settlement, etc.) to payment service server computing device(s) to facilitate POS transactions between merchants and customers. The merchant component 1836 can communicate the successes or failures of the POS transactions to the POS systems.

The training component 1838 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1802 and/or the server(s) 1804 for use at a time after the data models have been trained (e.g., at runtime).

The one or more other components and data 1840 can include modules and the functionality of which is described, at least partially, above. Further, the one or more other components and data 1840 can include programs, drivers, etc., and the data used or generated by the functional components. Further, the server(s) 1804 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that the modules generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1830 can additionally include an operating system 1842 for controlling and managing various functions of the server(s) 1804.

The communication interface(s) 1834 can include one or more interfaces and hardware components for enabling communication with various other devices, such as over the network(s) 1806 or directly. For example, communication interface(s) 1834 can enable communication through one or more network(s) 1806, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1806 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1804 can further be equipped with various I/O devices 1832. Such I/O devices 1832 can include a display, various user interface controls (e.g., buttons, joystick, keyboard, mouse, touch screen, biometric or sensory input devices, etc.), audio speakers, connection ports and so forth.

In at least one example, the system 1800 can include a datastore 1844 that can be configured to store data that is accessible, manageable, and updatable. In some examples, the datastore 1844 can be integrated with the user device 1802 and/or the server(s) 1804. In other examples, as shown in FIG. 18, the datastore 1844 can be located remotely from the server(s) 1804 and can be accessible to the server(s) 1804. The datastore 1844 can comprise multiple databases and/or servers connected locally and/or remotely via the network(s) 1806.

In at least one example, the datastore 1844 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the datastore 1844 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1844 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    receiving inputs via a user interface describing a plurality of contexts associated with user consumption of digital content;
    generating a plurality of context rules based on the inputs;
    generating a plurality of rule search results based on context data, the context data detailing the plurality of contexts associated with user consumption of the digital content;
    training, during use of respective context rules over time, one or more machine-learning models based on the context data;
    determining a transition point has been reached based on a target level of accuracy of the one or more machine-learning models;
    transitioning, responsive to the determining, from the use of the plurality of context rules to use of the one or more machine-learning models in generating a plurality of subsequent search results; and
    outputting the plurality of subsequent search results.

2. The method as described in claim 1, wherein transitioning from the use of the plurality of context rules to the use of the one or more machine-learning models includes progressively increasing a contribution to the plurality of subsequent search results generated by the one or more machine-learning models over time.

3. The method as described in claim 2, wherein:
    the inputs identify a particular context of the plurality of contexts and criteria usable to control output of the digital content within the particular context; and
    the generating the plurality of context rules is performed automatically and without user intervention using natural language understanding as part of a generative artificial intelligence technique.

4. The method as described in claim 1, wherein the training of the one or more machine-learning models is performed in parallel during the generating of the plurality of rule search results.

5. The method as described in claim 1, wherein the one or more machine-learning models are configured as an ensemble model that includes:
    a plurality of machine-learning models that are trained, respectively, for the plurality of contexts; and
    a weighting module that is trained to weight outputs of the plurality of machine-learning models as part of generating the subsequent search results.

6. The method as described in claim 1, further comprising displaying, in the user interface a plurality of representations, respectively, of the plurality of contexts and configuring a weighting module to apply a plurality of weights to search results involving the plurality of contexts based on the inputs received via the user interface.

7. The method as described in claim 1, wherein the plurality of contexts includes one or more of a user context, a biometric context, an environmental context, a digital content context, a consumption context, or a calendar context.

8. The method as described in claim 6, wherein the plurality of weights is used to apply weights to machine-learning search results generated by the one or more machine-learning models.

9. The method as described in claim 6, wherein the plurality of representations is configured as a plurality of overlapping shapes representative, respectively, of the plurality of contexts and a logical relationship of the plurality of contexts, one to another.

10. The method as described in claim 1, wherein the plurality of rule search results and the plurality of subsequent search results are configured as recommendations of items of the digital content.

11. A system comprising:
a processing device; and
a computer-readable storage medium storing instructions that, responsive to execution by the processing device, causes the processing device to perform operations including:
displaying a user interface having a plurality of representations of a plurality of contexts associated with user consumption of digital content;
determining whether inputs are received via user interaction with the user interface, the inputs indicating selection of one or more contexts of the plurality of contexts based on respective representations;
generating a plurality of rule search results based on the selected one or more contexts by processing context data, the context data detailing the plurality of contexts associated with the user consumption of the digital content;
displaying, in the user interface, the rule search results and representations of the one or more contexts used to generate the rule search results, the representations of the one or more contexts being user selectable to modify performance of a subsequent search; and
displaying, in the user interface, a plurality of subsequent search results that are generated by one or more machine-learning models trained and retrained based on the one or more contexts and the rule search results, wherein the displaying is performed in response to the one or more machine-learning models reaching a target level of accuracy.

12. The system as described in claim 11, wherein the plurality of contexts is associated, respectively, with a plurality of context rules and the rule search results are generated using context rules from the selected one or more contexts.

13. The system as described in claim 11, wherein the target level of accuracy is reached when a loss function exceeds a specific threshold.

14. The system as described in claim 11, wherein the user interface includes an option that is user selectable to control an amount of exploration or exploitation that is to be used to generate the rule search results and the generating of the rule search results is based on the amount.

15. The system as described in claim 11, wherein the displaying the user interface as having the plurality of representations of the plurality of contexts includes a first axis that is user selectable to select a particular context and a second axis that is user selectable to specify criteria pertaining to the particular context.

16. A method comprising:
receiving data describing a plurality of contexts associated with user consumption of digital content;
generating a user interface having a plurality of overlapping shapes representative, respectively, of the plurality of contexts and a logical relationship of the plurality of overlapping shapes;
determining whether an input is received via the user interface, the input adjusting the logical relationship of the plurality of overlapping shapes;
adjusting weights assigned to the plurality of contexts based on the logical relationship responsive to the determining;
displaying, in the user interface, a plurality of rule search results based on the adjusted weights assigned to the plurality of contexts;
generating a digital content recommendation using a machine-learning model trained and retrained based on the plurality of contexts and the plurality of rule search results, wherein the generating is performed in response to the machine-learning model reaching a target level of accuracy; and
controlling digital content output based on the digital content recommendation.

17. The method as described in claim 16, wherein the logical relationship of the plurality of overlapping shapes is displayed as a Venn diagram in the user interface.

18. The method as described in claim 16, wherein the digital content recommendation is configured to personalize the user interface.

19. The method as described in claim 16, wherein the controlling digital content output based on the digital content recommendation includes controlling streaming of digital audio over a network.

20. The method as described in claim 16, wherein the plurality of contexts are associated, respectively, with a plurality of machine-learning models and adjusting the weights includes adjusting weights applied to machine-learning search results output by the plurality of machine-learning models in generating the digital content recommendation.

* * * * *